(12) United States Patent
Seo et al.

(10) Patent No.: US 9,425,934 B2
(45) Date of Patent: Aug. 23, 2016

(54) METHOD AND USER DEVICE FOR RECEIVING DOWNLINK DATA, AND METHOD AND BASE STATION FOR TRANSMITTING DOWNLINK DATA

(71) Applicant: LG ELECTRONICS INC., Seoul (KR)

(72) Inventors: Hanbyul Seo, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 14/398,840

(22) PCT Filed: May 7, 2013

(86) PCT No.: PCT/KR2013/003948
§ 371 (c)(1),
(2) Date: Nov. 4, 2014

(87) PCT Pub. No.: WO2013/168958
PCT Pub. Date: Nov. 14, 2013

(65) Prior Publication Data
US 2015/0117350 A1    Apr. 30, 2015

Related U.S. Application Data

(60) Provisional application No. 61/643,875, filed on May 7, 2013, provisional application No. 61/647,494, filed on May 15, 2012.

(51) Int. Cl.
*H04L 5/00* (2006.01)
*H04L 1/06* (2006.01)
*H04B 7/04* (2006.01)

(52) U.S. Cl.
CPC ............ *H04L 5/0048* (2013.01); *H04B 7/0417* (2013.01); *H04L 1/06* (2013.01); *H04L 5/0057* (2013.01)

(58) Field of Classification Search
None
See application file for complete search history.

(56) References Cited

U.S. PATENT DOCUMENTS

2007/0217540 A1*  9/2007  Onggosanusi ....... H04B 7/0417
                                                        375/267
2011/0105137 A1*  5/2011  Gaal ................... H04B 7/0617
                                                        455/452.1

(Continued)

FOREIGN PATENT DOCUMENTS

WO    WO 2011/132988 A2    10/2011

OTHER PUBLICATIONS

Huawei et al., "Further details on simulation assumptions for R-PDCCH", 3GPP TSG-RAN WG4 Meeting #58AH, Agenda Item: 5.4.4, Shanghai, China, Apr. 11-15, 2011, 2 pages, R4-112045.

(Continued)

*Primary Examiner* — Gary Mui
(74) *Attorney, Agent, or Firm* — Birch, Stewart, Kolasch & Birch, LLP

(57) ABSTRACT

The present invention enables an increase in data transmission performance by variously applying precoding to open and closed-loop MIMOs. An eNB in the present invention applies an identical precoder to neighboring PRBs scheduled in UE in the closed-loop MIMO, and applies an non-identical precoder to neighboring PRBs scheduled in UE in an open-loop MIMO. The UE variously introduces a precoder applied to neighboring PRBs scheduled in the UE according to whether the MIMO set in the UE is the closed-loop MIMO or the open-loop MIMO.

16 Claims, 16 Drawing Sheets

(56) References Cited

U.S. PATENT DOCUMENTS

| | | | |
|---|---|---|---|
| 2011/0110444 A1* | 5/2011 | Roh | H04L 1/0003 375/260 |
| 2011/0170498 A1* | 7/2011 | Liu | H04L 5/0053 370/329 |
| 2011/0255505 A1* | 10/2011 | Liu | H04L 5/0007 370/330 |
| 2011/0310831 A1 | 12/2011 | Bhattad et al. | |
| 2012/0087401 A1* | 4/2012 | Bhattad | H04B 7/0486 375/224 |
| 2013/0053077 A1* | 2/2013 | Barbieri | H04B 7/0626 455/509 |

OTHER PUBLICATIONS

Intel Corporation, "Impact of ePDCCH on PDSCH PRB Bundling", 3GPP TSG RAN WG1 Meeting #68bis, Agenda Item: 7.6.4, JeJu, Korea, Mar. 26-30, 2012, 3 pages, R1-121536.

Interdigital Communications, LLC, "Reference Signals for ePDCCH", 3GPP TSG RAN WG1 Meeting #68, Agenda Item: 7.6.1, Dresden, Germany, Feb. 6-10, 2012, 5 pages, R1-120138.

* cited by examiner

FIG. 9 e.g., RIV=47

| VRB index | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|

| L\S | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 |
| 2 | 15 | 16 | 17 | 18 | 19 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 | 41 | 42 | 43 | 44 |
| 4 | 45 | 46 | 47 | 48 | 49 | 50 | 51 | 52 | 53 | 54 | 55 | 56 | 57 | 58 | 59 |
| 5 | 60 | 61 | 62 | 63 | 64 | 65 | 66 | 67 | 68 | 69 | 70 | 71 | 72 | 73 | 74 |
| 6 | 75 | 76 | 77 | 78 | 79 | 80 | 81 | 82 | 83 | 84 | 85 | 86 | 87 | 88 | 89 |
| 7 | 90 | 91 | 92 | 93 | 94 | 95 | 96 | 97 | 98 | 99 | 100 | 101 | 102 | 103 | 104 |
| 8 | 105 | 106 | 107 | 108 | 109 | 110 | 111 | 112 | 113 | 114 | 115 | 116 | 117 | 118 | 119 |
| 9 | 119 | 118 | 117 | 116 | 115 | 114 | 113 | 112 | 111 | 110 | 109 | 108 | 107 | 106 | 105 |
| 10 | 104 | 103 | 102 | 101 | 100 | 99 | 98 | 97 | 96 | 95 | 94 | 93 | 92 | 91 | 90 |
| 11 | 89 | 88 | 87 | 86 | 85 | 84 | 83 | 82 | 81 | 80 | 79 | 78 | 77 | 76 | 75 |
| 12 | 74 | 73 | 72 | 71 | 70 | 69 | 68 | 67 | 66 | 65 | 64 | 63 | 62 | 61 | 60 |
| 13 | 59 | 58 | 57 | 56 | 55 | 54 | 53 | 52 | 51 | 50 | 49 | 48 | 47 | 46 | 45 |
| 14 | 44 | 43 | 42 | 41 | 40 | 39 | 38 | 37 | 36 | 35 | 34 | 33 | 32 | 31 | 30 |
| 15 | 29 | 28 | 27 | 26 | 25 | 24 | 23 | 22 | 21 | 20 | 19 | 18 | 17 | 16 | 15 |

FIG. 15
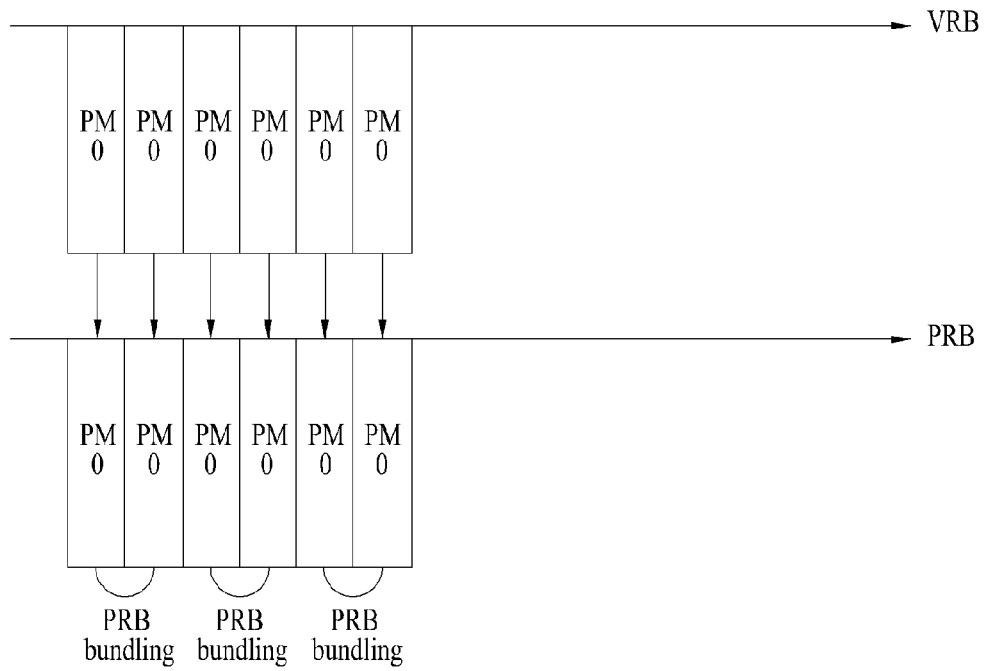
(a) Localized mapping with the same precoder
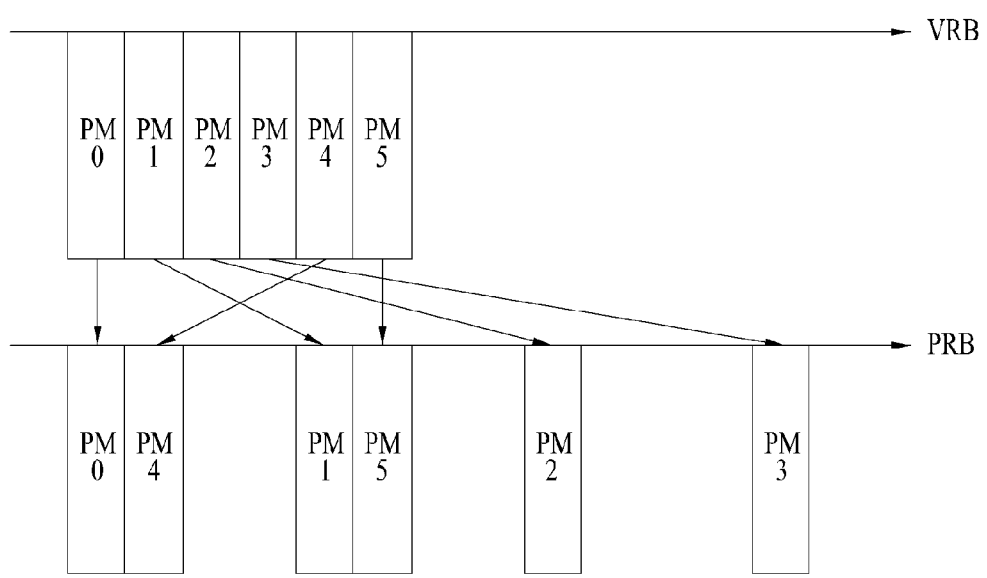
(b) Distributed mapping with the different precoder

METHOD AND USER DEVICE FOR RECEIVING DOWNLINK DATA, AND METHOD AND BASE STATION FOR TRANSMITTING DOWNLINK DATA

CROSS REFERENCE TO RELATED APPLICATIONS

This application is the National Phase of PCT International Application No. PCT/KR2013/003948, filed on May 7, 2013, which claims priority under 35 U.S.C. 119(e) to U.S. Provisional Application Nos. 61/643,875, filed on May 7, 2012 and 61/647,494 filed on May 15, 2012, all of which are hereby expressly incorporated by reference into the present application.

TECHNICAL FIELD

The present invention relates to a wireless communication system and, more particularly, to a method and apparatus for receiving downlink data and a method and apparatus for transmitting downlink data.

BACKGROUND ART

Multiple input multiple output (MIMO) is technology for raising communication capacity or a signal to interference-plus-noise ratio (SINR) in proportion to the number of antennas by using multiple antennas both at a transmitting end and a receiving end. For reference, a scheme of using multiple antennas only at the transmitting end is called multiple input single output (MISO), a scheme of using multiple antennas only at the receiving end is called single input multiple output (SIMO), and a scheme of using a single antenna at both the transmitting end and the receiving end is called single input single output (SISO). MIMO technology, nonetheless, can be used to collectively refer to MIMO, SIMO, MISO, and SISO schemes. The MIMO technology is called multi-antenna technology because multiple transmit antennas and/or multiple receive antennas are used unlike a conventional antenna scheme using a single transmit antenna and a single receive antenna, According to MIMO technology, the receiving end completes whole data by collecting fragments of data received from some antennas without depending upon a single antenna path in order to receive one whole message. As a result, MIMO technology may raise data transmission rate within a specific range or expand system range at a specific data transmission rate.

In a current radio communication environment, machine-to-machine (M2M) communication, various devices such as smartphones or tablet personal computers (PCs) requiring high data transmission rate, and various techniques have appeared and come into widespread use. This has rapidly increased the quantity of data which needs to be processed in a cellular network. Many communication operators or developers have shown an interest in MIMO technology among a variety of techniques capable of increasing data throughput and have made an effort to optimize MIMO technology because MIMO has the advantage of remarkably increasing transmission/reception performance and communication capacity even without allocating additional frequency or power.

MIMO technology may be used for transmit diversity, beamforming, spatial multiplexing, etc. Transmit diversity is a technique for raising transmission reliability by transmitting the same data through a plurality of transmit antennas. Beamforming is used to increase an SINR of a signal by adding a weight in a plurality of antennas according to a channel state. The weight may be expressed as a weight vector or a weight matrix, which is referred to as a precoding vector or a precoding matrix. Spatial multiplexing is technology capable of transmitting data at high rate without increasing bandwidth of a system by simultaneously transmitting different data through a plurality of transmit antennas. Spatial multiplexing is categorized into spatial multiplexing for a single user and spatial multiplexing for multiple users. Spatial multiplexing for a single user using MIMO is referred to as single user MIMO (SU-MIMO) and spatial multiplexing for multiple users using MIMO is referred to as spatial division multiple access (SDMA) or multiple user MIMO (MU-MIMO).

Meanwhile, the MIMO technology is divided into two transmission schemes: open-loop MIMO and closed-loop MIMO depending upon whether or not channel information about a radio channel formed between transmit antenna(s) and receive antenna(s) is shared between the transmitting end and the receiving end.

DETAILED DESCRIPTION OF THE INVENTION

Technical Problems

The present invention proposes a method for precoding and then transmitting data by a transmitting end and a method for receiving the precoded data by a receiving end in a MIMO system using multiple transmit antennas and/or multiple receive antennas.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for receiving downlink (DL) data by a user equipment (UE), including receiving the DL data on a physical downlink shared channel (PDSCH); and decoding the DL data using a UE specific reference signal (UE-RS) received on a physical resource block (PRB) to which the PDSCH is mapped. If a precoding matrix index (PMI) is configured to be fed back, the UE may decode the DL data under the assumption that PRB bundling in which the same precoder is applied to a plurality of contiguous PRBs is enabled. If rank information (RI) or a channel quality index (CQI) is configured to be fed back without the PMI or if a distributed virtual resource block (VRB) is assigned for the PDSCH, the UE may decode the DL data under the assumption that PRB bundling is disabled.

In another aspect of the present invention, provided herein is a user equipment (UE) for receiving downlink (DL) data, including a radio frequency (RF) unit; and a processor configured to control the RF unit. The processor may be configured to control the RF unit to receive the DL data on a physical downlink shared channel (PDSCH) and may be configured to decode the DL data using a UE specific reference signal (UE-RS) received on a physical resource block (PRB) to which the PDSCH is mapped. If a precoding matrix index (PMI) is configured to be fed back, the processor may be configured to decode the DL data under the assumption that PRB bundling in which the same precoder is applied to a plurality of contiguous PRBs is enabled. If rank information (RI) or a channel quality index (CQI) is configured to be fed back without the PMI or if a distributed virtual resource block (VRB) is assigned for the PDSCH, the processor may be configured to decode the DL data under the assumption that PRB bundling is disabled.

In still another aspect of the present invention, provided herein is a method for transmitting downlink (DL) data by a base station (BS), including transmitting the DL data to a user equipment (UE) on a physical downlink shared channel (PDSCH) and transmitting a UE specific reference signal (UE-RS) on a physical resource block (PRB) to which the PDSCH is mapped. If a precoding matrix index (PMI) is configured to be fed back to the UE, the BS may transmit the DL data and the UE-RS are transmitted by applying the same precoder to a plurality of contiguous PRBs, and if rank information (RI) or a channel quality index (CQI) is configured to be fed back to the UE without the PMI or if a distributed virtual resource block (VRB) is assigned for the PDSCH, the BS may transmit the DL data and the UE-RS by applying different precoders to the plurality of contiguous PRBs.

In a further aspect of the present invention, provided herein is a base station (BS) for transmitting downlink (DL) data, including a radio frequency (RF) unit; and a processor configured to control the RF unit. The processor may control the RF unit to transmit the DL data to a user equipment (UE) on a physical downlink shared channel (PDSCH). The processor may control the RF unit to transmit a UE specific reference signal (UE-RS) on a physical resource block (PRB) to which the PDSCH is mapped. If a precoding matrix index (PMI) is configured to be fed back to the UE, the processor may be configured to apply the same precoder to a plurality of contiguous PRBs. If rank information (RI) or a channel quality index (CQI) is configured to be fed back to the UE without the PMI or if a distributed virtual resource block (VRB) is assigned for the PDSCH, the processor may be configured to apply different precoders to the plurality of contiguous PRBs.

If PRB bundling is enabled, it may be assumed that the same precoder is applied to all PRBs allocated to the PDSCH among PRBs in a PRB group (PRG) including a predetermined number of contiguous PRBs.

The UE may receive information about one channel state information reference signal (CSI-RS) configuration or a plurality of CSI-RS configurations and feed back the RI or the CQI based on the one CSI-RS configuration or the plurality of CSI-RS configurations.

The RI or the CQI may be fed back based on one aggregated CSI-RS configuration formed by aggregating the plurality of CSI-RS configurations.

If the number N1 of antenna ports for the plurality of CSI-RS configurations is not equal to the number N2 (where N2<N1) of antenna ports defined in a codebook, it may be assumed that a CSI-RS is transmitted only over the N2 antenna ports among the N1 antenna ports.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, a downlink data signal can be effectively precoded and transmitted.

According to the present invention, a downlink data signal to which precoding is applied can be effectively decoded.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 illustrates a table used for start position and length determination in Type 2 RA.

FIG. 15 illustrates precoding granularity according to another embodiment of the present invention.

MODE FOR INVENTION

Figure 1:
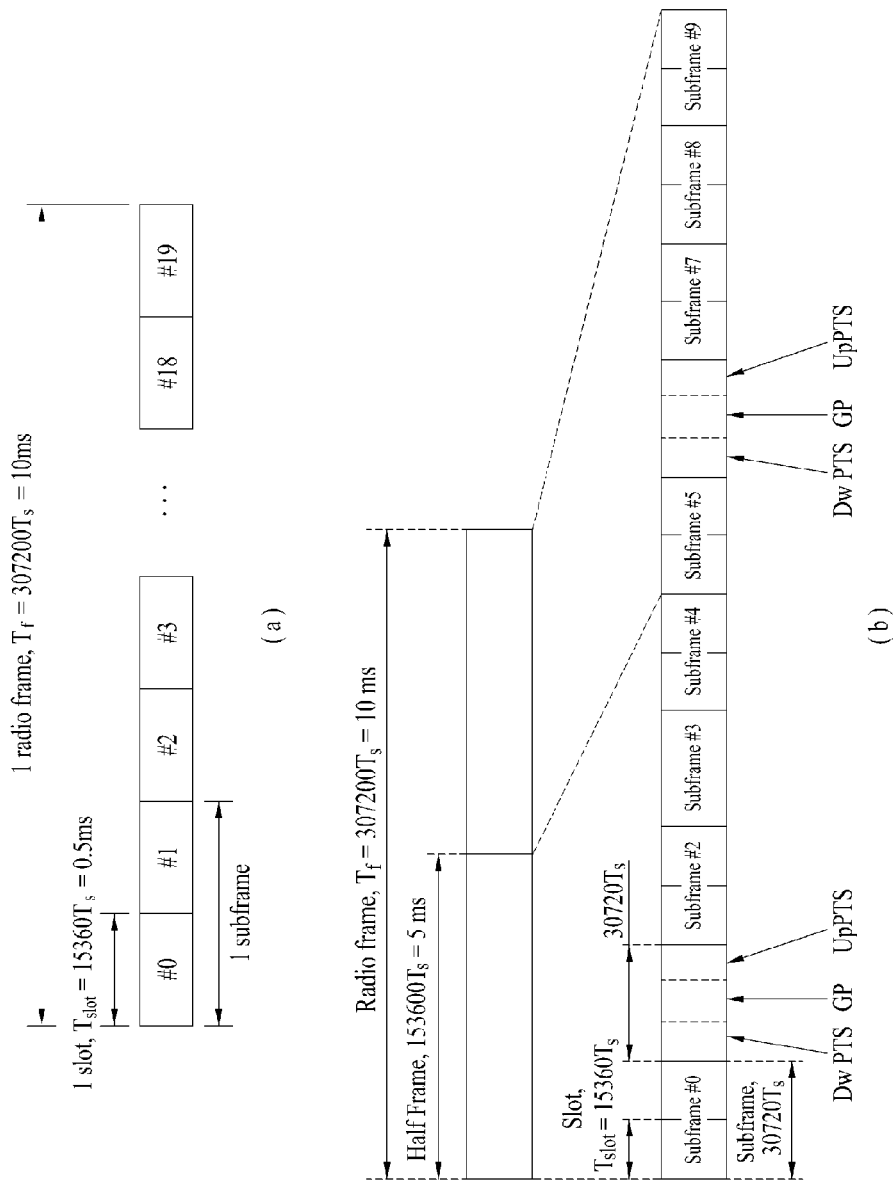
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In a multi-node system according to the present invention, which will be described below, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point Tx/Rx (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DSP). When JP is performed, a wider variety of communication environments can be formed, compared to other CoMP schemes. JT refers to a communication scheme by which a plurality of nodes transmit the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted from/to a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a downlink (DL)/uplink (UL) signal of a specific cell refers to a downlink/uplink signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. Meanwhile, a 3GPP LTE/LTE-A system uses the concept of a cell in order to manage radio resources and a Cell associated with the radio resources is distinguished from a cell of a geographic region.

A cell for managing radio resources will now be described. A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or bandwidth aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a bandwidth (BW) of 60 MHz. The CCs may be contiguous or non-contiguous in the frequency domain. A BW of UL CC and a BW of DL CC may be the same as each other and are symmetrical, and a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

The eNB may activate all or some of the serving CCs configured in the UE or deactivate some of the serving CCs for communication with the UE. The eNB may change the activated/deactivated CC, and may change the number of CCs which is/are activated or deactivated. If the eNB allocates available CCs to the UE cell-specifically or UE-specifically, at least one of the allocated CCs is not deactivated unless CC allocation to the UE is fully reconfigured or unless the UE performs handover. Such CC which is not deactivated unless CC allocation to the UE is full reconfigured will be referred to as a primary CC (PCC), and CC which may be activated/deactivated freely by the eNB will be referred to as secondary CC (SCC). The PCC and the SCC may be differentiated from each other on the basis of the control information. For example, specific control information may be set to be transmitted and received through a specific CC only. This specific CC may be referred to as the PCC, and the other CC(s) may be referred to as SCC(s).

In the meantime, the 3GPP LTE(-A) system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

The term "cell" used for carrier aggregation is distinguishable from the term "cell" indicating a certain local area where a communication service is provided by one eNB or one antenna group. In order to differentiate the "cell" indicating a certain local area from the "cell" used for carrier aggregation, in the present invention, the "cell" for carrier aggregation will be referred to as CC, whereas the "cell" for the local area will be simply referred to as cell.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
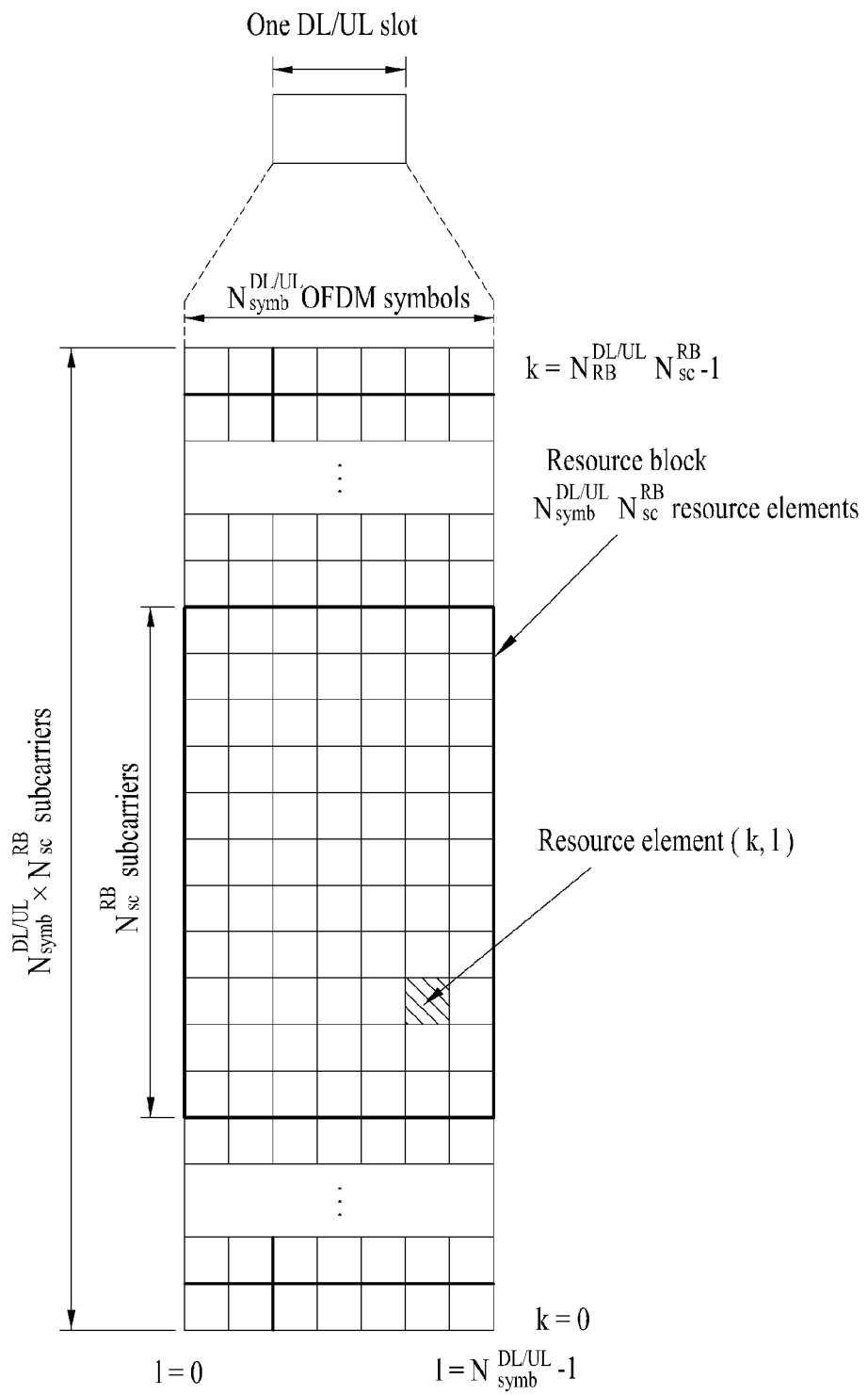
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $NN^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). The relation between the PRB number $n_{PRB}$ in the frequency domain and resource elements (k, l) in a slot can be defined as follows.

$$n_{PRB} = \left\lfloor \frac{k}{N^{RB}_{sc}} \right\rfloor \quad \text{[Equation 1]}$$

In Equation 1, k denotes a subcarrier index, and $N^{RB}_{sc}$ denotes the number of subcarriers included in one RB.

A VRB is a type of logical resource allocation unit introduced for resource allocation. The VRB is equal in size to the PRB. The VRB is classified into a localized VRB (LVRB) and a distributed VRB (DVRB) according to a VRB-to-PRB mapping scheme. Regardless of VRB type, a pair of RBs is allocated over two slots of a subframe by a single VRB number $n_{VRB}$. LVRBs are directly mapped to PRBs so that VRB numbers (or VRB indexes) correspond equally to PRB numbers. That is, $n_{PRB} = n_{VRB}$. The LVRBs are numbered from 0 to $N^{DL}_{VRB} - 1$ and $N^{DL}_{VRB} = N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Two PRBs, which are respectively located at two slots of the subframe and have the same VRB number, will be referred to as VRB pair. A PRB pair and a VRB pair may be referred to as a RB pair. The RB for a UE or UE group is allocated on the basis of the VRB. Basically, VRBs having the same VRB number are allocated to the same UE or UE group. Mapping of the localized VRB to the PRB is called localized mapping and mapping of the distributed VRB to the PRB is called distributed mapping. A method of mapping the VRB to the PRB will be described in more detail with reference to FIG. 5.

Figure 3:
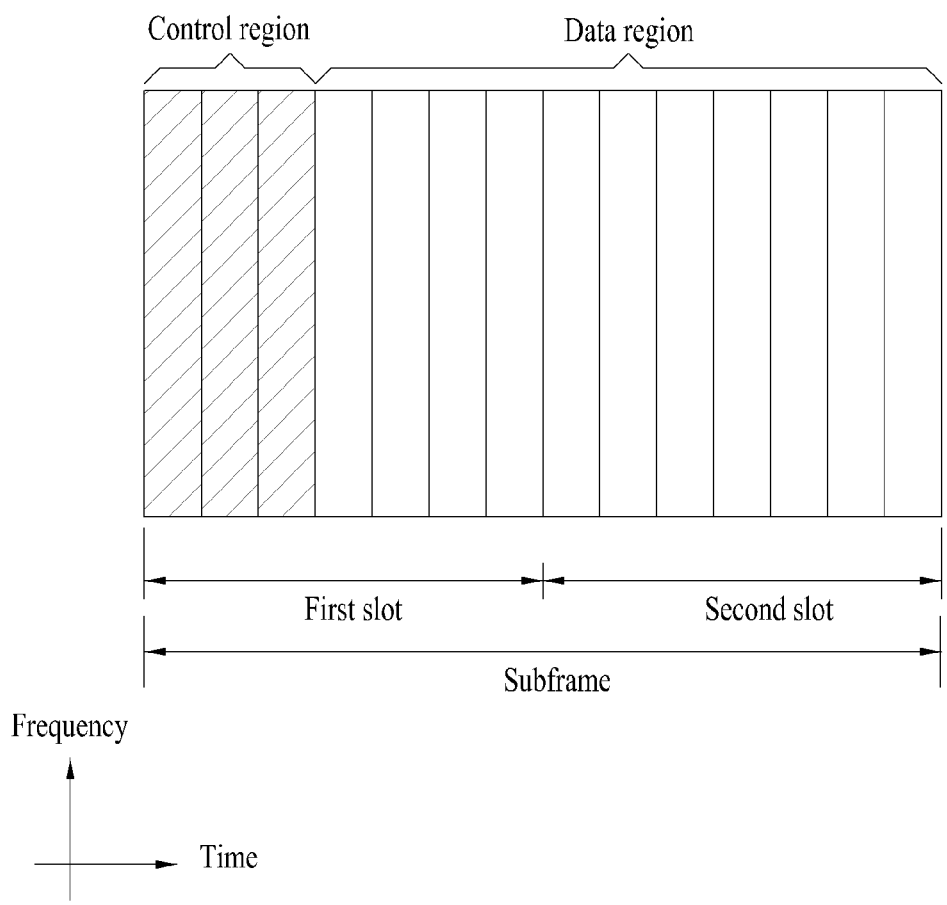
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. A transmit format and resource allocation information of a downlink shared channel (DL-SCH) are called DL scheduling information or DL grant. A transmit format and resource allocation information of an uplink shared channel (UL-SCH) are called UL scheduling information or UL grant. The size and usage of the DCI carried by one PDCCH are varied depending on DCI formats. The size of the DCI may be varied depending on a coding rate.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on an aggregation of one or a plurality of continuous control channel elements (CCEs). The CCE is a logical allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channels (that is, PCFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs may have different sizes and a dedicated SS and a common SS are defined. The dedicated SS is a UE-specific SS and is configured for each individual UE. The common SS is configured for a plurality of UEs. All UEs receive information about the common SS. An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

In the meantime, in order to maintain operation load based on blind decoding at a certain level or less, not all the DCI formats are searched at the same time. For example, the UE is configured semi-statically by upper layer signaling to receive PDSCH data signaled through the PDCCH in accordance with one of transmission modes 1 to 9. Table 3 illustrates a transmission mode for configuring multi-antenna technology and a DCI format where the UE performs blind decoding in accordance with the corresponding transmission mode.

TABLE 3

| Transmission mode | DCI format | Search Space | Transmission scheme of PDSCH corresponding to PDCCH |
| --- | --- | --- | --- |
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |

TABLE 3-continued

| Transmission mode | DCI format | Search Space | Transmission scheme of PDSCH corresponding to PDCCH |
|---|---|---|---|
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
| | DCI format 2C | UE specific by C-RNTI | Up to 8 layer transmission, ports 7-14 |

Transmission modes 1 to 9 are listed in Table 3 but transmission modes other than the transmission modes listed in Table 3 may be defined.

In particular, Table 3 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 3. For example, if the UE is configured in a transmission mode 1 by upper layer signaling, the UE acquires either DCI of DCI format 1A or DCI of DCI format 1 by respectively decoding the PDCCH through the DCI format 1A and 1.

Figure 4:
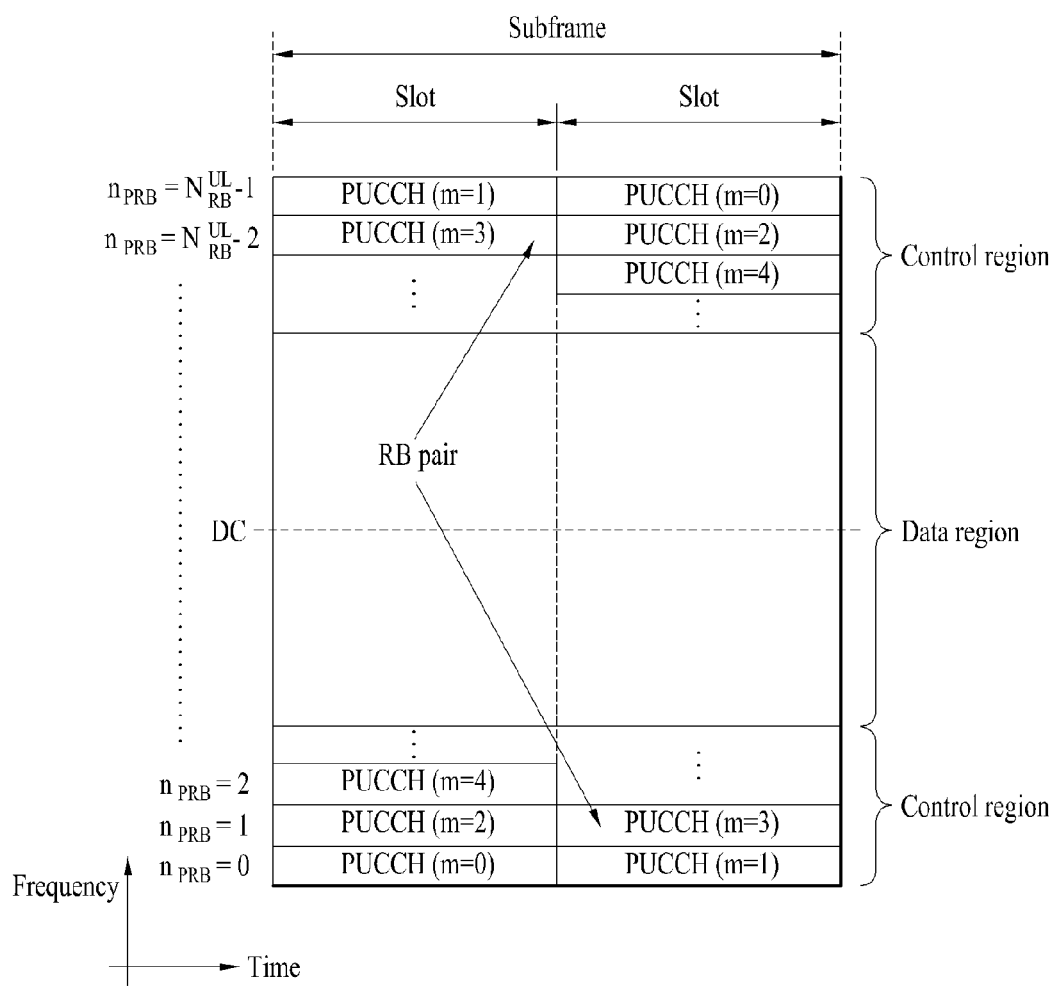
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. MIMO-related feedback information includes a rank indicator (RI) and a precoding matrix indicator (PMI).

Figure 5:
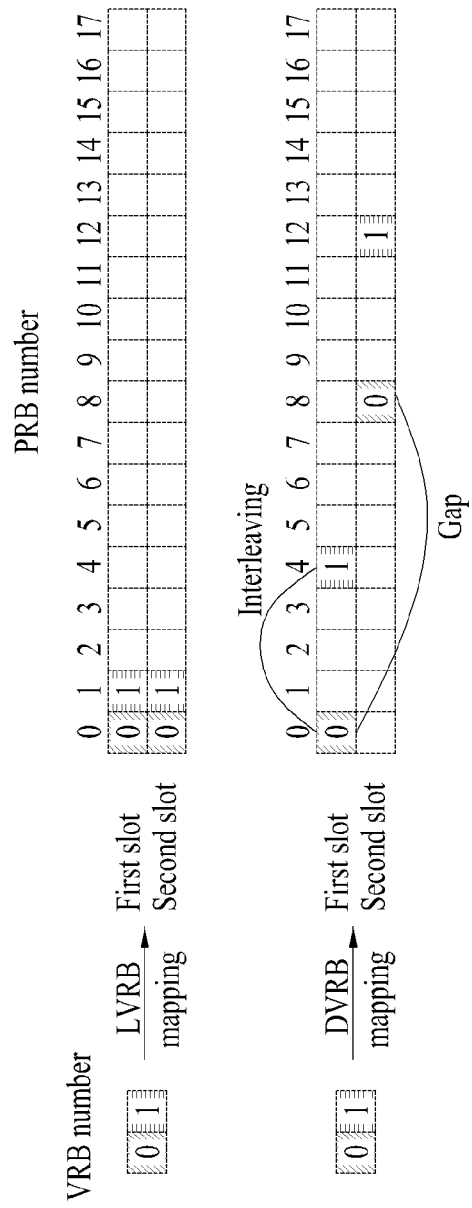
FIG. 5 illustrates a method of mapping a virtual resource block (VRB) to a physical resource block (PRB).

FIG. 5 illustrates a method of mapping a VRB to a PRB.

Referring to FIG. 5, LVRBs are directly mapped to PRBs so that VRB numbers (or VRB indexes) correspond equally to PRB numbers. That is, $n_{PRB}=n_{VRB}$. The LVRBs are numbered from 0 to $N^{DL}_{VRB}-1$ and $N^{DL}_{VRB}=N^{DL}_{RB}$. Hence, according to a localized mapping scheme, VRBs having the same VRB number are mapped to PRBs of the same PRB number in the first and second slots. In contrast, DVRBs are mapped to PRBs after being interleaved. Accordingly, DVRBs having the same VRB number may be mapped to PRBs of different PRB numbers in the first and second slots. Specifically, the DVRBs may be mapped to the PRBs as follows. The following table illustrates RB gap values.

TABLE 3

| | Gap ($N_{gap}$) | |
|---|---|---|
| System BW ($N_{RB}^{DL}$) | 1st Gap ($N_{gap,1}$) | 2nd Gap ($N_{gap,2}$) |
| 6-10 | $\lceil N_{RB}^{DL}/2 \rceil$ | N/A |
| 11 | 4 | N/A |
| 12-19 | 8 | N/A |
| 20-26 | 12 | N/A |
| 27-44 | 18 | N/A |
| 45-49 | 27 | N/A |
| 50-63 | 27 | 9 |
| 64-79 | 32 | 16 |
| 80-110 | 48 | 16 |

$N_{gap}$ denotes a frequency gap (e.g. PRB unit) when VRBs of the same number are mapped to PRBs of the first and second slots. If $6 \leq N^{DL}_{RB} \leq 49$ only one gap is defined ($N_{gap}=N_{gap,1}$). If $50 \leq N^{DL}_{RB} \leq 110$, two gap values $N_{gap,1}$ and $N_{gap,2}$ are defined. $N_{gap}=N_{gap,1}$ or $N_{gap}=N_{gap,2}$ is signaled through DL scheduling. DVRBs are numbered from 0 to $N^{DL}_{VRB}-1$. For $N_{gap}=N_{gap,1}$, $N^{DL}_{VRB}=N^{DL}_{VRB,gap1}=2\cdot\min(N_{gap}, N^{DL}_{RB}-N_{gap})$. For $N_{gap}=N_{gap,2}$, $N^{DL}_{VRB}=N^{DL}_{VRB,gap2}=\text{floor}(N^{DL}_{RB}/2\cdot N_{gap})\cdot 2\cdot N_{gap}$. Here, min(A, B) indicates the smaller of A and B and floor(x) indicates the largest integer not greater than x.

Consecutive $\tilde{N}_{VRB}^{DL}$ numbers constitute a unit for VRB number interleaving. If $N_{gap}=N_{gap,1}$, then $\tilde{N}_{VRB}^{DL}=N^{DL}_{VRB}$ and if $N_{gap}=N_{gap,2}$, then $\tilde{N}_{VRB}^{DL}=2N_{gap}$. VRB number interleaving of each interleaving unit may be performed using four columns and $N_{row}$ rows. $N_{row}=\{\text{ceil}(\tilde{N}_{VRB}^{DL}/(4P))\}\cdot P$ and P is the size of an RBG. Here, ceil denotes a ceiling function and ceil(x) is a minimum integer not smaller than x. An RBG is defined as P consecutive RBs. VRB numbers are written in a matrix on a row-by-row basis and are read on a column-by-column basis. $N_{null}$ null values are inserted into the last $N_{null}/2$ row of the second and fourth columns and $N_{null}=N_{row}-\tilde{N}_{VRB}^{DL}$. The null values are ignored upon reading.

Meanwhile, in a 3GPP LTE/LTE-A system, various resource allocation (RA) types (e.g. Type 0 RA, Type 1 RA, Type 2 RA, etc.) are defined. For Type 0 RA or Type 1 RA, DCI formats 1, 2, and 2A are used and, for Type 2 RA, DCI formats 1A, 1B, 1C, and 1D are used. In Type 0 RA, RB allocation information includes a bitmap indicating a resource block group (RBG) allocated to a UE. The RBG is a set of one or more continuous PRBs. The size of the RBG depends upon system bandwidth. In Type 1 RA, RB allocation information indicates resources in an RBG subset allocated to a scheduled UE in units of PRBs. In Type 2 RA, RB allocation information indicates a set of VRBs continuously allocated to the scheduled UE.

Figure 6:
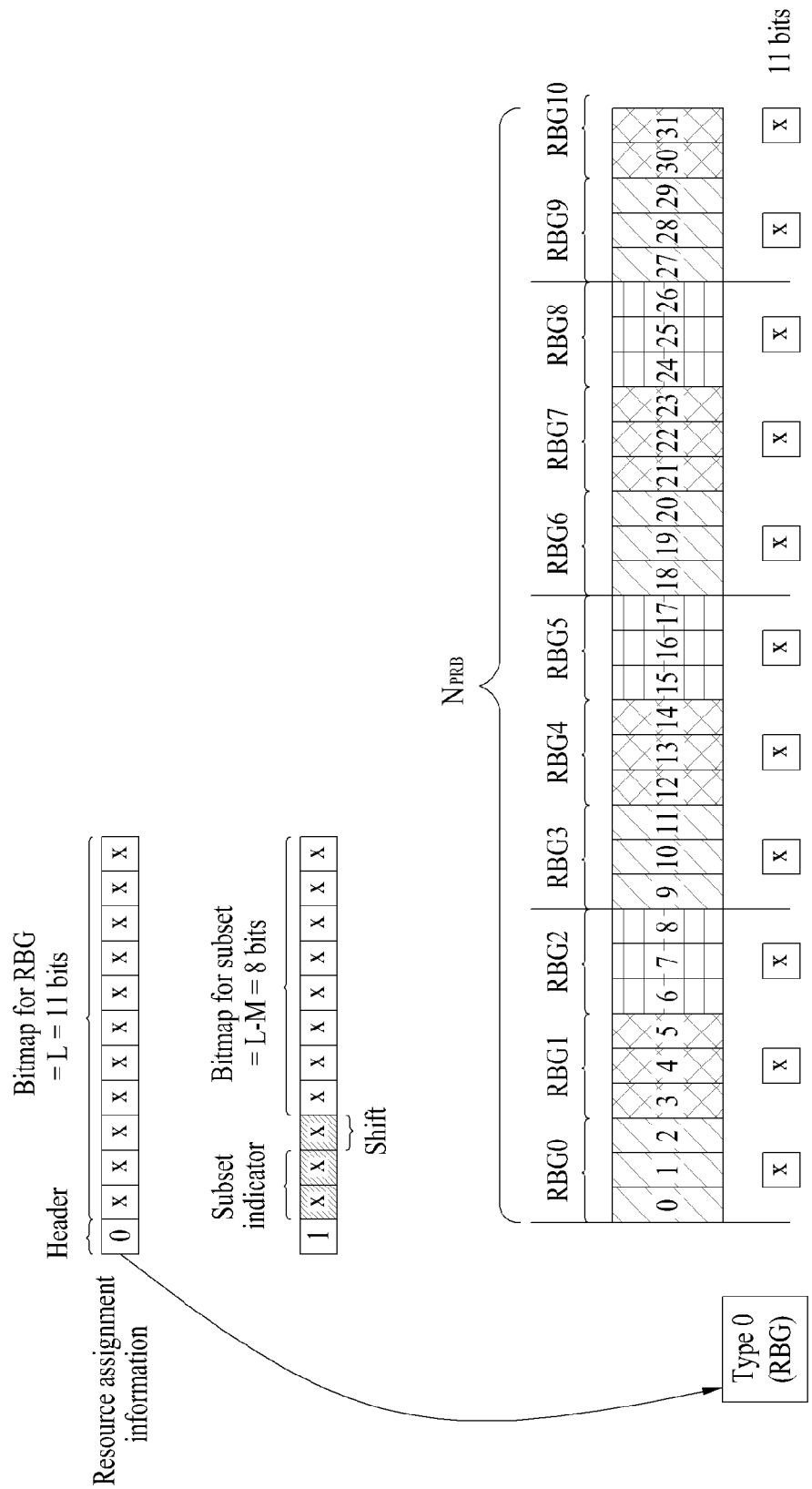
FIG. 6 illustrates control information formats for Type 0 resource allocation (RA) and an example of resource allocation thereof.
Figure 7:
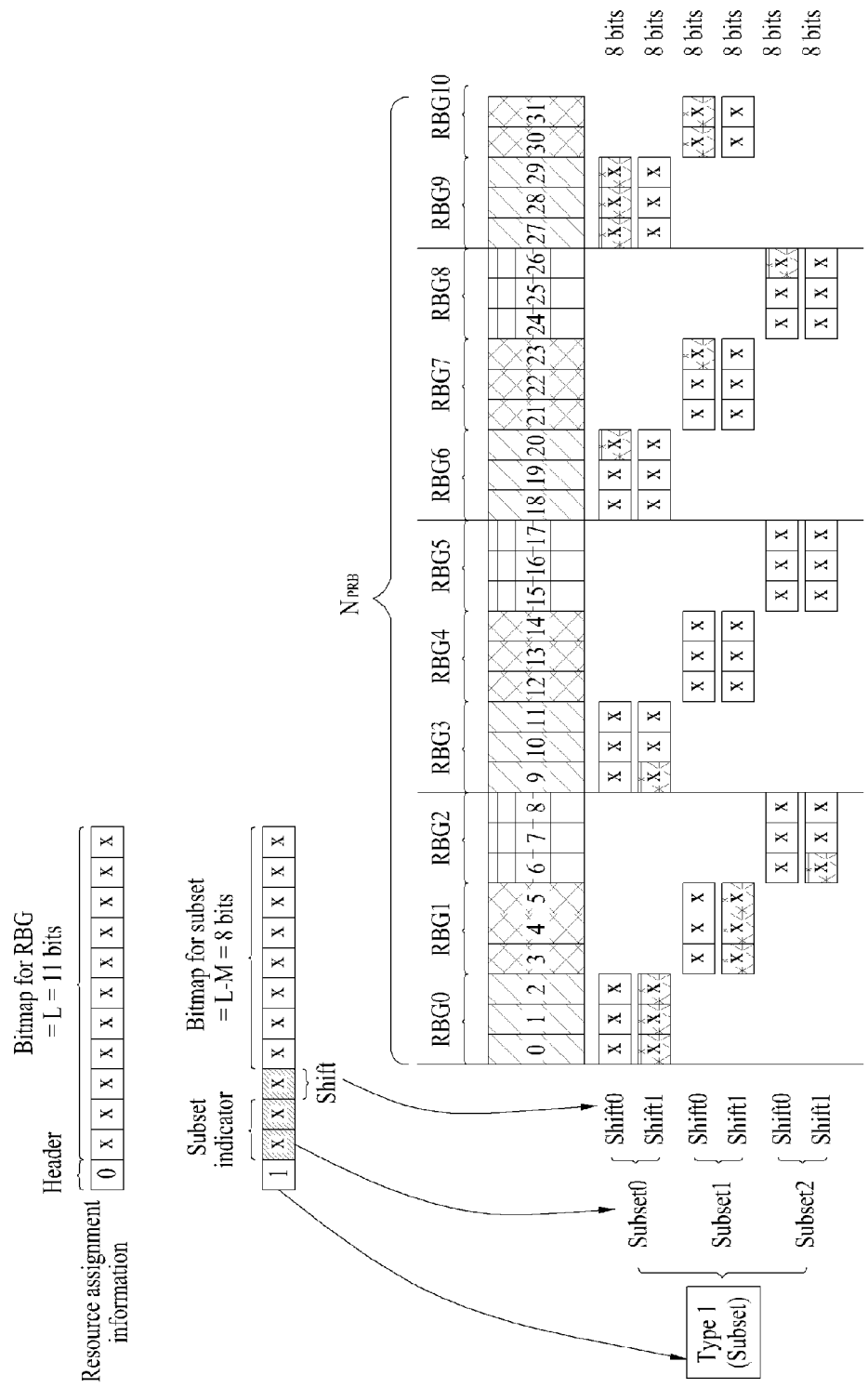
FIG. 7 illustrates control information formats for Type 1 RA and an example of resource allocation thereof.
Figure 8:
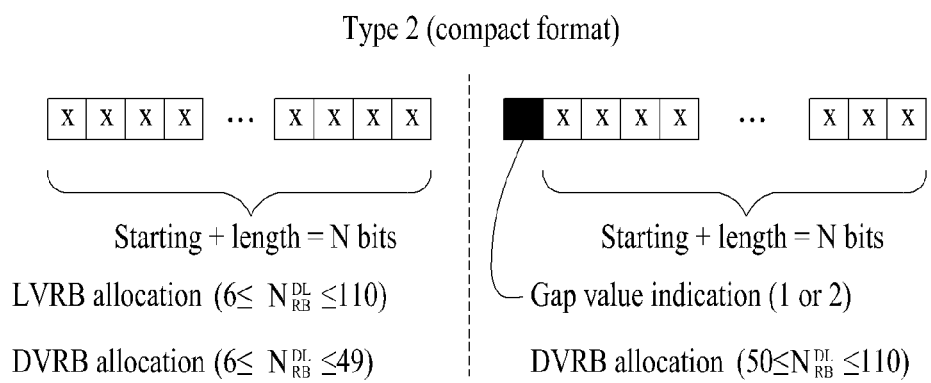
FIG. 8 illustrates control information formats for Type 2 RA and an example of resource allocation thereof.

Hereinafter, resource allocation defined in legacy LTE will be described referring to FIG. 6 to FIG. 9. FIG. 6, FIG. 7 and FIG. 8 illustrate control information formats for Type 0 resource allocation (RA), Type 1 RA, and Type 2 RA and examples of resource allocation thereof, respectively. FIG. 9 illustrates a table used for start position and length determination in Type 2.

A UE interprets a resource allocation field based on a detected PDCCH DCI format. The resource allocation field in each PDCCH includes two parts: a resource allocation header field and actual RB assignment information. PDCCH DCI formats 1, 2, and 2A for Type 0 and Type 1 RA have the same format and are distinguished by a single-bit resource allocation header field which is present according to DL system bandwidth. Specifically, Type 0 RA is indicated by 0 and Type 1 RA is indicated by 1. While PDCCH DCI formats 1, 2, and 2A are used for Type 0 or Type 1 RA, PDCCH formats 1A, 1B, 1C, and 1D are used for Type 2 RA. A PDCCH DCI format having Type 2 RA does not include a resource allocation header field. The resource allocation field indicates a PRB set of the first slot. Since slot hopping does not exist between the first slot and the second slot in the case of RA Type 0, Type 1, and Type 2-LVRB, which will be described later, the same PRB set as in the first slot is allocated in the second slot (i.e. PRB index (of the first slot)=PRB index (of the second slot)). Meanwhile, in the case of RA Type 2-DVRB, if the PRB set of the first slot is given, the PRB set of the second slot is determined by a slot hopping rule.

Referring to FIG. 6, in Type 0 RA, RB assignment information includes a bitmap indicating an RBG allocated to a UE. The RBG is a set of consecutive PRBs. The size of the RBG, P, depends upon system bandwidth as follows.

TABLE 5

| System Bandwidth $N_{RB}^{DL}$ | RBG Size (P) |
|---|---|
| ≤10 | 1 |
| 11-26 | 2 |
| 27-63 | 3 |
| 64-110 | 4 |

In DL system bandwidth having $N^{DL}_{RB}$ PRBs, a total number of RBGs, $N_{RBG}$, is given by $N_{RBG}=\text{ceil}(N^{DL}_{RB}/P)$, the size of floor$(N^{DL}_{RB}/P)$ RBGs is P, and the size of one RBG is $N^{DL}_{RB}-P\cdot\text{floor}(N^{DL}_{RB}/P)$ when $N^{DL}_{RB}$ mod P>0. Here, mod indicates a modulo operation. The size of a bitmap is $N_{RBG}$ and each bit corresponds to one RBG. All RBGs are indexed 0 to $N_{RBG}-1$ in a frequency increase direction and RBG 0 to RBG $N_{RBG}-1$ are mapped from a most significant bit (MSB) to a least significant bit (LSB) of the bitmap. The RBG is allocated to the UE if the corresponding bit value in the bitmap is 1, the RBG is not allocated to the UE otherwise.

Referring to FIG. 7, in Type 1 RA, RB assignment information having the size of $N_{RBG}$ informs a scheduled UE of resources in an RBG subset in PRB units. An RBG subset p (0≤p<P) consists of every P-th RBG starting from an RBG p. The RB assignment information includes three fields. The first field has ceil$\{\log_2(P)\}$ bits and indicates an RBG subset selected from among P RBG subsets. The second field has one bit and indicates shift of a resource assignment span within a subset. The shift is triggered when a bit value is 1 and is not triggered when a bit value is not 1. The third field includes a bitmap and each bit indicates one PRB within a selected RBG set. The size of a bitmap part used to indicate a PRB within the selected RBG subset is $N^{TYPE1}_{RB}$ and is defined as follows.

$$N_{RB}^{TYPE1}=\lfloor N_{RB}^{DL}/P \rfloor - \lceil \log_2(P) \rceil -1 \quad \text{[Equation 2]}$$

An addressable PRB number in a selected RBG subset may start from an offset $\Delta_{shift}(p)$ from the smallest PRB number within the selected RBG subset and may be mapped to the MSB of a bitmap. The offset is expressed by the number of PRBs and is applied within the selected RBG subset. When the bit value within the second field for shift of the resource assignment span is set to 0, an offset for an RBG subset p is given as $\Delta_{shift}(p)=0$. In the other cases, the offset for the RBG subset p is given as $\Delta_{shift}(p)=N^{RBGsubset}_{RB}(p)-N^{TYPE1}_{RB}$. $N^{RBGsubset}_{RB}(p)$ denotes the number of PRBs within the RBG subset p and may be obtained as follows.

$$N_{RB}^{RBG\,subset}(p) = \quad \text{[Equation 3]}$$

$$\begin{cases} \left\lfloor \frac{N_{RB}^{DL}-1}{P^2} \right\rfloor \cdot P + P, & p < \left\lfloor \frac{N_{RB}^{DL}-1}{P} \right\rfloor \bmod P \\ \left\lfloor \frac{N_{RB}^{DL}-1}{P^2} \right\rfloor \cdot P + (N_{RB}^{DL}-1) \bmod P + 1, & p = \left\lfloor \frac{N_{RB}^{DL}-1}{P} \right\rfloor \bmod P \\ \left\lfloor \frac{N_{RB}^{DL}-1}{P^2} \right\rfloor \cdot P, & p > \left\lfloor \frac{N_{RB}^{DL}-1}{P} \right\rfloor \bmod P \end{cases}$$

Consequently, when RBG subset p is indicated, bit i for i=0, 1, . . . , $N^{TYPE1}_{RB}-1$ in the bitmap field indicates a following VRB number.

$$n_{VRB}^{RBG\ subset}(p) = \left\lfloor \frac{i+\Delta_{shift}(p)}{P} \right\rfloor P^2 + p \cdot P + (i+\Delta_{shift}(p))\bmod P \quad \text{[Equation 4]}$$

Referring to FIG. 8, in Type 2 RA, RB assignment information indicates a set of LVRBs or DVRBs consecutively allocated to a scheduled UE. If resource assignment is signaled in PDCCH DCI format 1A, 1B, or 1D, a 1-bit flag indicates whether an LVRB or DVRB is allocated (e.g. 0 denotes LVRB assignment and 1 denotes DVRB assignment). In contrast, if resource assignment is signaled in PDCCH DCI format 1C, only a DVRB is always allocated. A Type 2 RA field includes a resource indication value (RIV) and the RIV corresponds to a start RB $RB_{start}$ and length. The length denotes the number of virtually and consecutively allocated RBs.

For example, referring to FIG. 9, RIV=47 means that a total of four RBs are allocated starting from an RB of which VRB index is 2.

Figure 10:
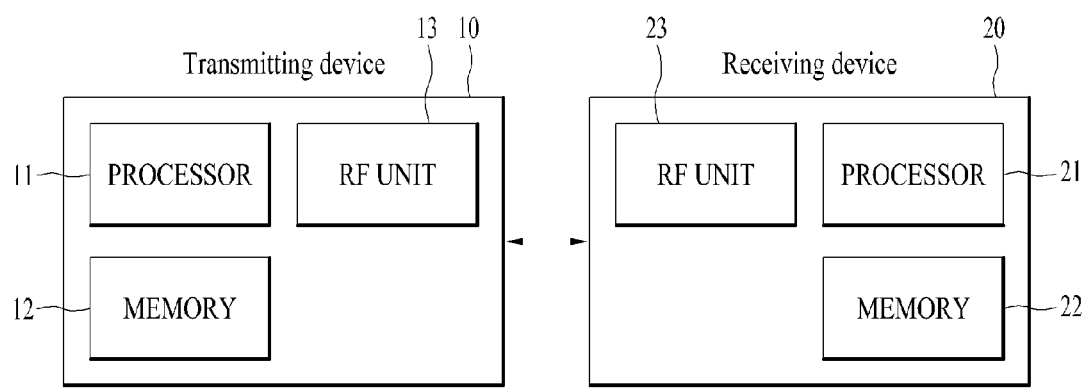
FIG. 10 is a block diagram illustrating elements of a transmitting device 10 and a receiving device 20 for implementing the present invention.

FIG. 10 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL.

Figure 11:
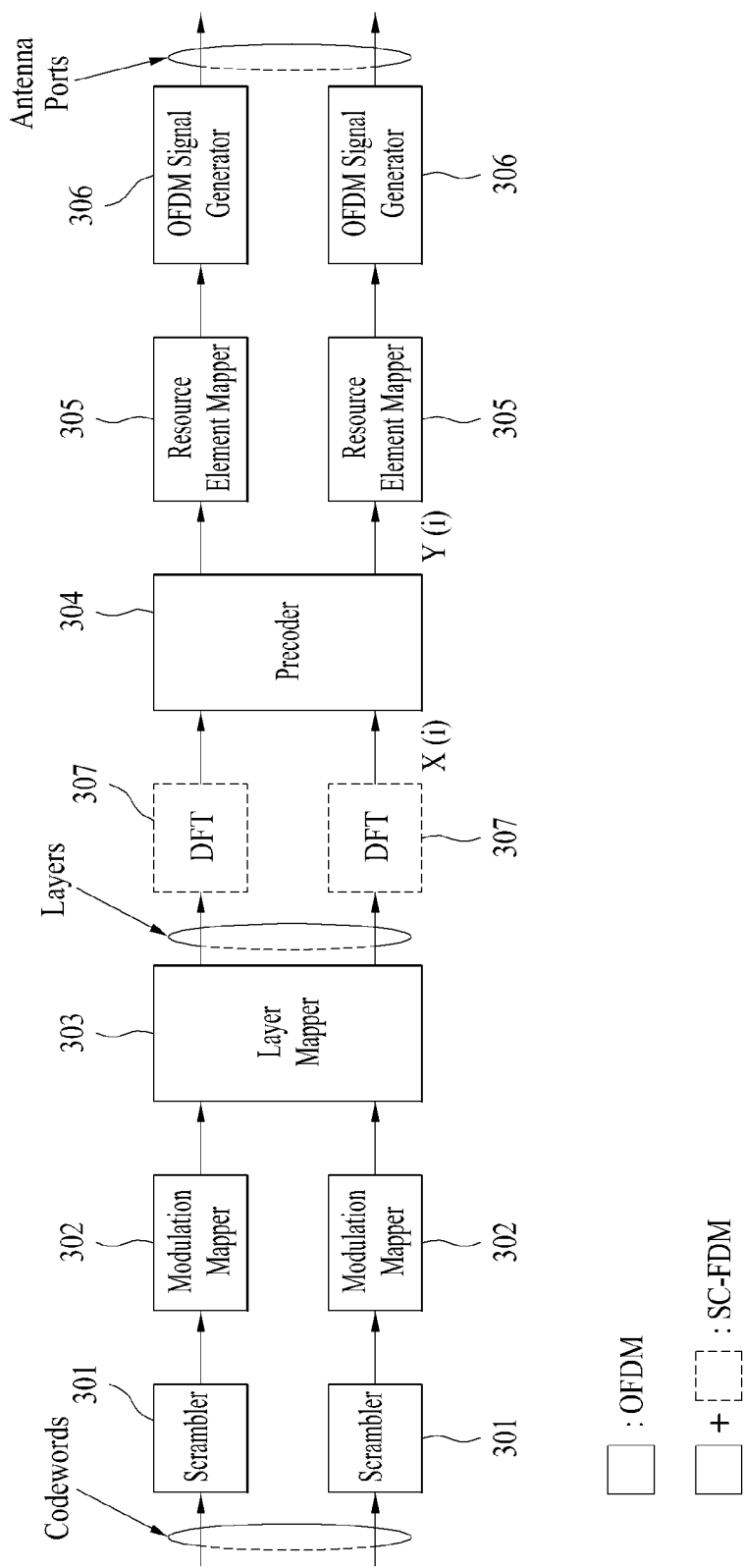
FIG. 11 illustrates an overview of physical channel processing

FIG. 11 illustrates an overview of physical channel processing. A baseband signal representing a PUSCH or a PDSCH may be defined by a processing procedure of FIG. 11.

Referring to FIG. 11, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and A is corresponding to the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 in FIG. 10 may be configured to include the scramblers 301, the modulation mappers 302, the layer mapper 303, the precoder 304, the RE mappers 305, and the OFDM signal generators 306. Likewise, the processor 21 of the receiving device 20 in FIG. 10 may be configured to include the signal recoverer, the multiplexer, and the channel demodulator.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

Figure 12:
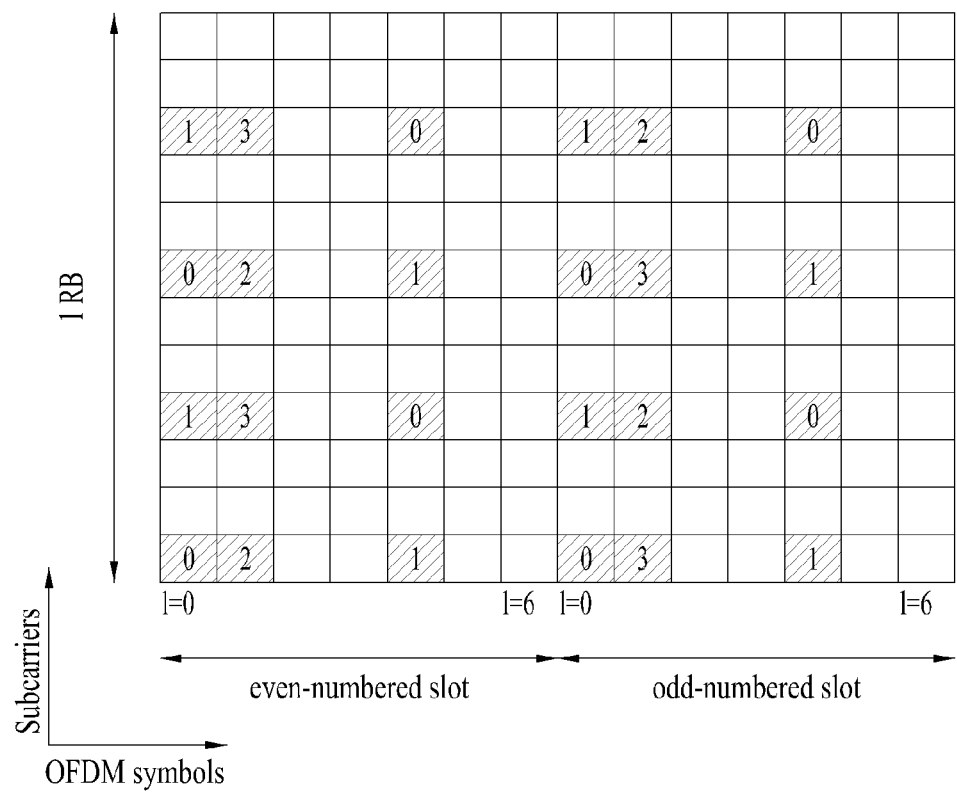
FIG. 12 illustrates configuration of cell specific reference signals (CRSs).

FIG. 12 illustrates configuration of CRSs. Especially, FIG. 12 illustrates configuration of CRSs for a 3GPP LTE system supporting a maximum of four antennas.

Since CRSs are used for both demodulation and measurement, the CRSs are transmitted in all DL subframes in a cell supporting PDSCH transmission and are transmitted through all antenna ports configured for an eNB. A UE may measure CSI using the CRSs and demodulate a signal received on a PDSCH in a subframe including the CRSs. For reference, since demodulation is a part of a decoding process, the term demodulation in embodiments of the present invention is used interchangeably with decoding.

More specifically, CRS sequence $r_{l,n_s}(m)$ is mapped to complex-valued modulation symbols $a_{k,l}^{(p)}$ used as reference symbols for antenna port p in slot $n_s$ according to the following equation.

$$a_{k,l}^{(p)} = r_{l,n_s}(m') \qquad \text{[Equation 5]}$$

In Equation 5, $n_s$ is the slot number in a radio frame, and l is the OFDM symbol number within the slot, which is determined according to the following equation.

$$k = 6m + (v + v_{shift}) \bmod 6 \qquad \text{[Equation 6]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

In Equation 6, k denotes a subcarrier index, l denotes an OFDM symbol index, and $N^{max,DL}_{RB}$ denotes the largest DL bandwidth configuration, expressed as an integer multiple of $N^{RB}_{sc}$.

Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 7]}$$

The cell-specific frequency $v_{shift}$ is given by a physical layer cell identity $N^{cell}_{ID}$ as follows.

$$v_{shift} = N^{cell}_{ID} \bmod 6 \quad \text{[Equation 8]}$$

Figure 13:
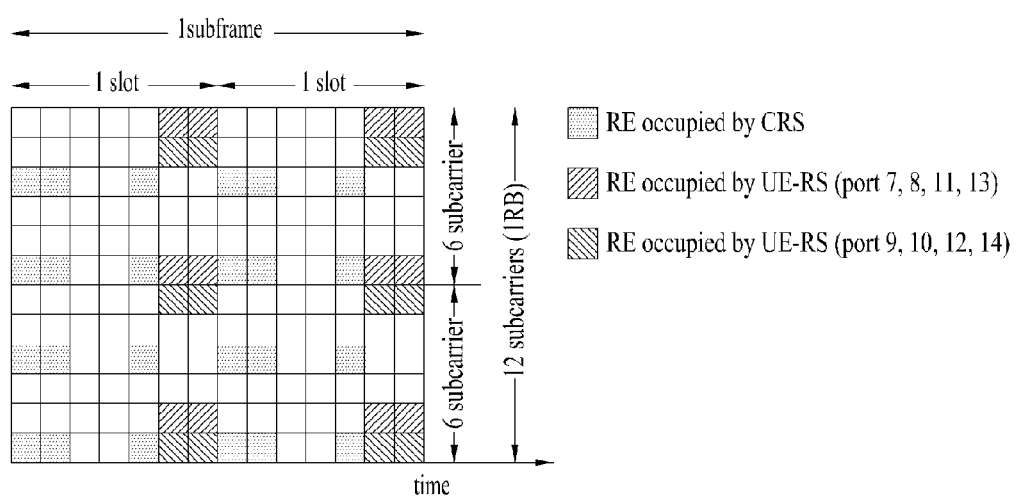
FIG. 13 illustrates UE-specific reference signals (UE-RSs).

FIG. 13 illustrates UE-specific reference signals (UE-RSs). In more detail, FIG. 13 illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present.

In the 3GPP LTE-A system, the UE-RSs are defined in a PRB pair. Referring to FIG. 13, in a PRB having frequency-domain index $n_{PRB}$ assigned for PDSCH transmission with respect to p=7, p=8, or p=7, 8, . . . , υ+6, a part of UE-RS sequence r(m) is mapped to complex modulation) symbols $a_{k,l}^{(p)}$ in a subframe according to the following equation.

$$a_{k,l}^{(p)} = w_p(l') \cdot r(3 \cdot l' \cdot N^{max,DL}_{RB} + 3 \cdot n_{PRB} + m') \quad \text{[Equation 9]}$$

In Equation 9, $w_p(i)$, l', m are given as follows.

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases} \quad \text{[Equation 10]}$$

$$k = 5m' + N^{RB}_{sc} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in a special subframe with configuration 1, 2, 6, or 7 (see Table 2)} \\ 2, 3 & \text{if } n_s \bmod 2 = 1 \text{ and not in a special subframe with configuration 1, 2, 6, or 7 (see Table 2)} \end{cases}$$

$$m' = 0, 1, 2$$

In Equation 10, the sequence $\overline{w}_p(i)$ for normal CP is given according to the following equation.

TABLE 6

| Antenna port p | $[\overline{w}_p(0)\ \overline{w}_p(1)\ \overline{w}_p(2)\ \overline{w}_p(3)]$ |
|---|---|
| 7  | [+1 +1 +1 +1] |
| 8  | [+1 −1 +1 −1] |
| 9  | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 11]}$$

$$m = \begin{cases} 0, 1, \ldots, 12N^{max,DL}_{RB} - 1 & \text{normal cyclic prefix} \\ 0, 1, \ldots, 16N^{max,DL}_{RB} - 1 & \text{extended cyclic prefix} \end{cases}$$

c(i) is a pseudo-random sequence. The pseudo-random sequence generator for generating c(i) is initialized with $c_{init}$ at the start of each subframe according to the following equation.

$$c_{init} = (\lfloor n_s/2 \rfloor + 1) \cdot (2N^{cell}_{ID} + 1) \cdot 2^{16} + n_{SCID} \quad \text{[Equation 12]}$$

where $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

In the present invention, a layer refers to a path of each piece of information input to a precoder and is also called a transmission layer, a stream, a transmission stream, a data stream, etc. Transmission data is mapped to one or more layers. Therefore, data is transmitted to a receiving device from a transmitting device by one or more layers. A PDSCH may be transmitted based on a CRS or a UE-RS. Referring to Table 3, a CRS based PDSCH is transmitted to a UE configured as one of transmission modes 1 to 8 and a UE-RS based PDSCH is transmitted to a UE configured as transmission mode 9. In other words, the UE configured as one of transmission modes 1 to 8 uses the CRS when decoding the PDSCH and the UE configured as transmission mode 9 uses the UE-RS when decoding the PDSCH. In addition to transmission mode 9, new transmission modes may be defined as long as the UE-RS based PDSCH is transmitted may be defined. Embodiments of the present invention which will be described hereinbelow may be applied to transmission modes in which the UE-RS based PDSCH is transmitted irrespective of names of the transmission modes.

Particularly, in the 3GPP LTE-A system, a maximum of 8 layers are spatially multiplexed using antenna port(s) p=7, 8, . . . , υ+6 having UE-RSs. The UE-RSs in one-to one correspondence to layers are precoded together with the layers and then are transmitted. Hence, the UE may estimate a DL channel through UE-RS(s) and then demodulate a signal transmitted on a PDSCH under the assumption that the PDSCH has been transmitted on the same effective channel as the estimated channel. As a result, unlike CRS-based PDSCH transmission requiring that the eNB should explicitly inform the UE of a PMI of a precoding matrix applied to a PDSCH, UE-RS based PDSCH transmission causes the UE to be transparently informed of a precoding matrix that the eNB applies to transmission data even though the eNB does not explicitly signal the precoding matrix to the UE. Accordingly, upon transmitting the PDSCH using UE-RSs, the eNB does not need to separately inform the UE of information about the precoding matrix applied to the transmission data, i.e. information about a precoder.

Referring to FIG. 13, REs occupied by PDSCHs and REs occupied by UE-RSs are present in a PRB pair. The UE may perform demodulation of the PDSCHs in a corresponding PRB based on a result of channel estimation obtained through the UE-RSs. According to such UE-RS based demodulation operation, the same precoding matrix is generally applied to PDSCHs transmitted on one antenna port in the same PRB.

MIMO operation using multiple transmit/receive antennas may be broadly categorized into closed-loop MIMO and open-loop MIMO. In closed-loop MIMO, the UE measures a channel from the eNB and reports an optimal precoding matrix selected based on the measured channel to the eNB and then the eNB performs MIMO transmission based on the reported precoding matrix. In open-loop MIMO, the eNB performs MIMO transmission by selecting a precoding matrix without feedback operation of the UE for information about the precoding matrix to the eNB. Generally, closed-loop MIMO exhibits better signal transmission performance than open-loop MIMO when CSI is reliable but requires CSI feedback overhead relative to open-loop MIMO that does not entail feedback and even deteriorates signal transmission performance in a situation in which the CSI is not reliable as in a situation in which the UE moves fast. On the other hand, open-loop MIMO does not require that the eNB additionally receive the information about the precoding matrix from the UE and thus has an advantage of providing stable signal transmission performance regardless of a channel state between the eNB and the UE.

Since closed-loop MIMO requires feedback of a PMI, feedback overhead greatly increases if a different PMI needs to be fed back according to a PRB. In addition, since frequency selectivity is limited between contiguous PRBs, PRB bundling for causing the UE to estimate channel states of the contiguous PRBs as well under the assumption that the same precoder is applied to UE-RSs of the contiguous PRBs is effective in closed-loop MIMO. That is, for PDSCH transmission to the UE for which closed-loop MIMO is configured, the same precoder may be applied to contiguous PRBs to which PDSCHs are mapped. For example, if PMI feedback is configured for the UE, the present invention may be interpreted as setting of closed-loop MIMO operation for the UE and, in this case, the UE may assume that the same precoder is applied to contiguous PRBs scheduled for data transmission to the UE and thus decode data received in the contiguous PRBs. In other words, according to the present invention, if closed-loop MIMO operation is configured, the UE may assume that precoders applied to UE-RSs on a prescribed number of PRBs for PDSCH transmission to the UE are equal and estimate a DL channel corresponding to a PDSCH by using the UE-RSs. In more detail, the UE configured for transmission mode 9 for given serving cell CC c may assume that precoding granularity is multiple resource blocks when PMI/RI feedback is configured. Fixed system bandwidth-dependent precoding resource block groups (PRGs) of size P' partition system bandwidth and each PRG consists of consecutive PRBs. If $N^{DL}_{RB}$ mod P'>0, then one of the PRGs has a size of $N_{RB}^{DL} - P' \lfloor N_{RB}^{DL}/P' \rfloor$. The PRG size is non-increasing starting at the lowest frequency. The UE for which PMI/RI feedback is configured may receive or decode a PDSCH by assuming that the same precoder applies on all scheduled PRBs within a PRG. The PRG size that the UE may assume for given system bandwidth is given by:

TABLE 7

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

Meanwhile, in open-loop MIMO, it is very difficult to fixedly use a precoder for a specific PDSCH as a specific matrix because the eNB cannot be accurately aware of a proper precoding matrix for a DL channel in open-loop MIMO. Accordingly, in the case of open-loop MIMO having no information about precoding, it is desirable to obtain diversity in terms of antenna space by varying a precoding matrix in a different resource. Due to this problem, in CRS based open-loop MIMO, a precoding matrix differs according to each RE and the same precoding matrix is applied to the same REs (i.e. REs having the same subcarrier index k and the same OFDM symbol index 1) even through the REs belong to different PRBs.

Figure 14:
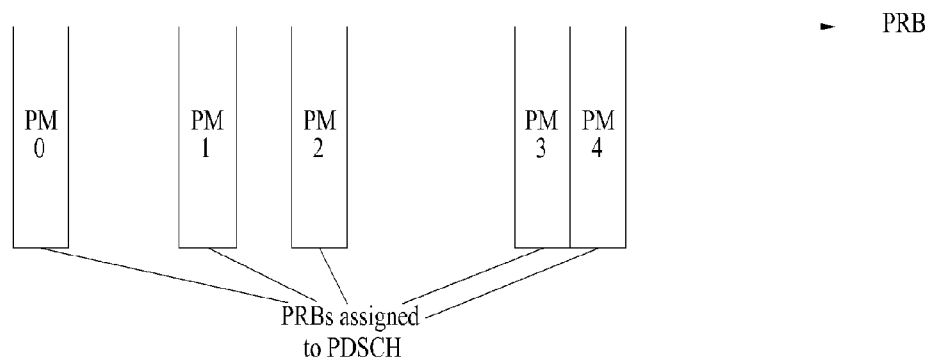
FIG. 14 illustrates precoding granularity according to an embodiment of the present invention.

FIG. 14 illustrates precoding granularity according to an embodiment of the present invention.

As described with reference to FIG. 13, it is generally assumed that the same precoding is applied to UE-RS based PDSCHs within one PRB. Accordingly, referring to FIG. 14, different precoding matrices (PMs) are preferably applied in different PRBs separated from each other in the frequency domain because spatial diversity can be obtained by different PMs. Even when a PM differs according to a PRB, the UE estimates a channel using UE-RSs present in the PRB and demodulates a PDSCH in the PRB by assuming that the PDSCH is transmitted on the same channel as the estimated channel. Accordingly, the UE is transparently aware of which PM is applied to each PRB and a reception structure of the same PDSCH as a closed-loop MIMO based PDSCH can be maintained. The concept of the reception structure of the PDSCH includes UE-RS channel estimation and PDSCH demodulation operation in the unit of PRBs and a DCI structure for scheduling a relevant PDSCH.

As described above, in open-loop MIMO, since precoding matrices are desirably changed even in contiguous PRBs to obtain spatial diversity, it is preferable not to apply PRB bundling in open-loop MIMO unlike closed-loop MIMO capable of improving system performance through PRB bundling operation. Accordingly, the present invention proposes selectively performing PRB bundling depending upon closed-loop MIMO or open-loop MIMO.

An eNB of the present invention may inform a UE of whether PRB bundling can be performed through a high-layer signal such as a radio resource control (RRC) signal or through a predetermined field included in DCI. Information about PRB bundling is appropriate especially when the eNB is capable of obtaining UL CSI and DL CSI through a UL SRS. This is because, since the UE simply transmits the SRS according to the request of the eNB, the UE is unable to know whether the eNB tries to obtain only the UL CSI through the SRS (i.e. whether the eNB tries to perform only UL closed-loop MIMO) or to obtain UL CSI and DL CSI (i.e. tries to perform UL closed-loop MIMO and DL closed-loop MIMO).

In an embodiment of the present invention, information related to setting of open-loop MIMO and/or information related to setting of closed-loop MIMO may be used as a signal for disabling or enabling PRB bundling. That is, if open-loop MIMO operation is configured for the UE, the UE may consider a signal for configuring the open-loop MIMO operation as an implicit signal for disabling PRB bundling. In contrast, if closed-loop MIMO operation is configured for the UE, the UE may consider a signal for configuring the closed-loop MIMO operation as an implicit signal for enabling PRB bundling. Even when PRB bundling is disabled, UE-RS based open-loop MIMO of the present invention differs from CRS based open-loop MIMO. In CRS based open-loop MIMO, a precoding matrix differs according to an RE irrespective of a PRB. Meanwhile, in UE-RS based open-loop MIMO of the present invention, the same precoding matrix is applied to REs occupied by a PDSCH and REs occupied by UE-RS(s) in one PRB and, for different PRBs, different precoding matrices may be applied to the different PRBs even though REs have the same subcarrier and the same OFDM symbol index.

For example, if the UE is configured to report an RI or a CQI without a PMI upon feedback of CSI, it may be interpreted that open-loop MIMO is configured for the UE. Especially, the eNB that desires to perform open-loop MIMO transmission to the UE may transmit, to the UE, a CSI reporting indication indicating that the UE should calculate and then report the RI or the CQI based on a DL RS but need not to report the PMI. Upon receiving the CSI reporting indication indicating that the UE should report the RI and/or the CQI without the PMI, the UE may regard the CSI reporting indication as an implicit signal indicating that PRB bundling is not performed. If PRB bundling is disabled, the UE may not assume that the same precoder is applied to contiguous PRBs to decode a PDSCH. That is, if PRB bundling is disabled, the UE may demodulate the PDSCH by separately performing channel estimation per PRB to which the PDSCH is mapped even when PRBs are contiguous. In contrast, upon receiving the CSI reporting indication indicating that the PMI should be reported, the UE may consider the CSI reporting indication as an implicit signal for enabling PRB bundling. If PRB bundling is enabled, the UE may assume that the same precoder is applied to contiguous PRBs in decoding the PDSCH. In more detail, if PRB bundling is enabled, the UE may decode the PDSCH under the assumption that the same precoder is applied to contiguous PRBs to which the PDSCH is mapped or to all PRBs to which the PDSCH is mapped among PRBs in a PRG.

FIG. 15 illustrates precoding granularity according to another embodiment of the present invention. In FIG. 15, it is assumed that a PRG consists of two PRBs.

According to another embodiment of the present invention, PRB bundling may depend upon a PDSCH resource allocation method. In the 3GPP LTE/LTE-A system, after a PDSCH is allocated to VRB(s), the VRB(s) is mapped to PRB(s). A method for mapping a VRB to a PRB includes localized mapping and distributed mapping as described with reference to FIG. 5. Generally, in closed-loop MIMO operation, since the eNB is able to be aware of a frequency band showing an optimal channel state based on CSI reporting from the UE and of an optimal PM for the frequency band, it is favorable to intensively allocate the PDSCH to the frequency band showing the optimal channel state. Accordingly, localized mapping is used in closed-loop MIMO. Meanwhile, in open-loop MIMO, since it is not clear which frequency band exhibits good performance due to shortage of CSI, it is more preferable to map the PDSCH to separate RBs than to intensively map the PDSCH to a partial frequency band. Accordingly, distributed mapping is mainly used in open-loop MIMO. In the case of resource allocation of a distribution type, since contiguous VRBs to which the PDSCH is mapped will be mapped to PRBs distributed in the frequency domain, it is preferable not to perform PRB bundling assuming that the same precoder is applied to multiple PRBs. In this embodiment, even though the UE is capable of performing PRB bundling, for example, even though the UE is configured to perform closed-loop MIMO operation by feeding back a PMI, the UE does not perform PRB bundling upon demodulating/decoding the PDSCH to which DVRB allocation is assigned and performs PRB bundling only upon demodulating/decoding the PDSCH to which LVRB allocation is assigned.

Referring to FIG. 15, whether PRB bundling is applied may differ according to localized mapping and distributed mapping. Even during distributed mapping, contiguous PRBs may be allocated to the same PDSCH according to the number of VRBs etc. For example, when a depth-4 block interleaver is used during a PRB mapping process, if the number of VRBs to which the PDSCH is mapped exceeds 4, VRBs mapped to contiguous PRBs occur as illustrated in FIG. 15(b). In the present embodiment, although contiguous PRBs in a PRG are for the same PDSCH, PRB bundling is not applied for spatial diversity when DVRB allocation is assigned to the PDSCH.

Whether to perform PRB bundling may be determined according to a type of information included in a PDSCH. For example, a PDSCH carrying system information or a PDSCH carrying paging information is targeted not at a single UE but at multiple UEs. Therefore, since a PM optimized for a specific UE cannot be selected with respect to such a PDSCH, the PDSCH is desirably transmitted based on open-loop MIMO in order to obtain spatial diversity. Another embodiment of the present invention proposes that PRB bundling be disabled with respect to the PDSCH including system information (e.g. a PDSCH scheduled by DCI masked with an SI-RNTI) or the PDSCH including paging information (e.g. a PDSCH scheduled by DCI masked with a P-RNTI) and the UE perform channel estimation for decoding the PDSCH on an RB basis under the assumption that a PM applied to each PRB may be different although PRBs are contiguous. In this embodiment, although the UE is in a situation in which PRB bundling can be performed, for example, although the UE is configured to perform closed-loop MIMO operation by feeding back a PMI, the UE does not perform PRB bundling upon demodulating the PDSCH carrying the system information or the paging information and may apply PRB bundling only to a PDSCH unicast to the UE (e.g. a PDSCH scheduled by DCI masked with a C-RNTI of the UE).

Meanwhile, even in a situation in which open-loop MIMO operation is performed, the UE may calculate and report an RI or a CQI so that the eNB may determine a rank or a modulation and coding scheme (MCS) suitable for the UE. In order to calculate the RI or the CQI in open-loop MIMO, the UE needs to assume a proper precoding scheme. As described above, since UE-RS based open-loop MIMO operates such that the same precoder is applied to all REs in a PRB but different precoders may be applied to different PRBs, the UE may calculate the RI or the CQI under the assumption that the eNB applies different precoders to different PRBs. The UE configured to calculate the RI or the CQI under the assumption that different precoders are applied to different PRBs may operate so as not to perform PRB bundling in demodulating an actually transmitted PDSCH. That is, the UE configured under the assumption that different precoders are applied to different PRBs may operate so as to perform only channel estimation in the unit of RBs. In particular, if open-loop MIMO is configured for the UE, the eNB may command the UE to demodulate a PDSCH based on a UE-RS with respect to PDSCH demodulation and command the UE to calculate and report the RI and the CQI and not to report a PMI with respect to CSI reporting. The UE may consider a CSI reporting indication having these characteristics as an implicit signal indicating that the RI or the CQI is calculated under the assumption that the eNB applies different precoders to different PRBs. The UE may calculate the RI or the CQI under the assumption that a PM in a PMI codebook in which a precoder to be used in each PRB is configured for feedback of the PMI is randomly selected. Alternatively, it may be assumed that a specific PM is used in a specific PRB during RI/CQI calculation. For example, if a PMI codebook for a specific rank is defined to include $PM_0, PM_1, \ldots PM_{N-1}$, the UE may calculate the RI/CQI under the assumption that corresponding PMs are sequentially used in respective PRBs (e.g. $PM_0$ is used in $PRB_0$ and $PM_1$ is used in $PRB_1$). In this case, since precoders having as many different attributes as possible in the spatial domain are used in contiguous PRBs to maximize spatial diversity, PMs assuming use in contiguous PRBs are preferably selected to be as orthogonal as possible. Meanwhile, PMs of a PMI codebook of a specific rank are divided into multiple groups such that PMs belonging to each group may have as different (e.g. orthogonal) spatial characteristics as possible. Upon calculating the RI/CQI, the UE may operate to calculate the CSI under the assumption that PMs of a single group are used in contiguous PRBs. For instance, 3GPP LTE/LTE-A defines 16 rank-1 PMs from $PM_0$ to $PM_{15}$ for four antenna ports. The 16 PMs may be properly divided into four groups such as $\{PM_0, PM_1, PM_2, PM_3\}$, $\{PM_4, PM_5, PM_6, PM_7\}$, $\{PM_8, PM_9, PM_{10}, PM_{11}\}$, and $\{PM_{12}, PM_{13}, PM_{14}, PM_{15}\}$ and four PMs belonging to the same group may be set to be orthogonal to each other. In this case, the UE may calculate the RI/CQI under the assumption that $PM_k$ is used in $PRB_{16n+k}$.

The UE for which open-loop MIMO as described above is configured calculates the RI and/or the CQI and reports the calculated RI and/or CQI to the eNB under the assumption that the eNB cyclically uses a precoder per PRB. Such RI/CQI calculation may be performed based on a CSI-RS. The CSI-RS is a DL RS introduced in the 3GPP LTE-A system, not for demodulation but for channel measurement. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following equation.

$$a_{k,l}^{(p)} = w_{l''} \cdot r_{l,n_s}(m) \quad \text{[Equation 13]}$$

In Equation 13, $w_{l''}$, k, l are given by the following equation.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases} \quad \text{[Equation 14]}$$

$$l = l' + \begin{cases} l'' & \text{CSI reference signal configurations } 0 - 19, \text{ normal cyclic prefix} \\ 2l'' & \text{CSI reference signal configurations } 20 - 31, \text{ normal cyclic prefix} \\ l'' & \text{CSI reference signal configurations } 0 - 27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$

where (k', l') and necessary conditions on $n_s$ are given by Table 8 and Table 9 in a normal CP and an extended CP, respectively. That is, CSI-RS configurations of Table 8 and Table 9 denote locations of REs occupied by a CSI-RS of each antenna port in an RB pair.

TABLE 8

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 9

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 16:
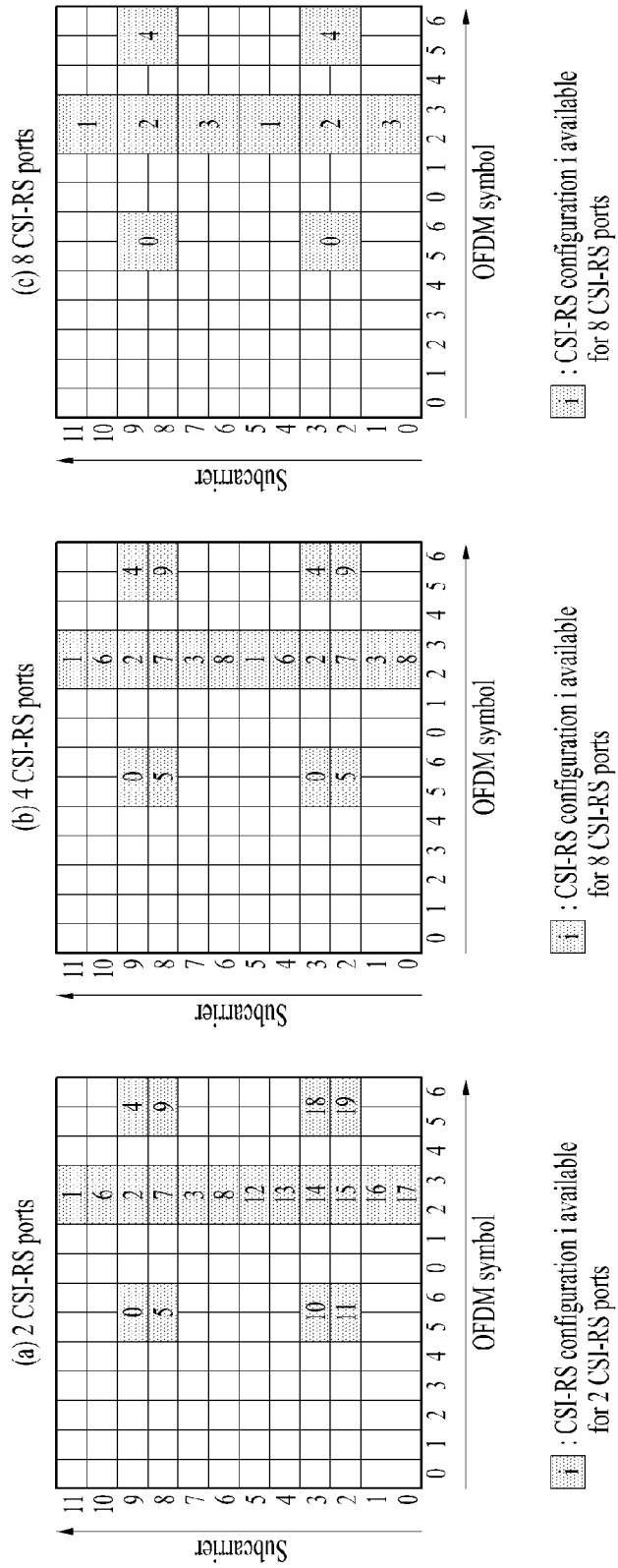
FIG. 16 illustrates channel state information reference signal (CSI-RS) configurations.

FIG. 16 illustrates CSI-RS configurations. Particularly, FIG. 16(a) illustrates 20 CSI-RS configurations 0 to 19 available for CSI-RS transmission through two CSI-RS ports among the CSI-RS configurations of Table 8, FIG. 16(b) illustrates 10 available CSI-RS configurations 0 to 9 through four CSI-RS ports among the CSI-RS configurations of Table 8, and FIG. 16(c) illustrates 5 available CSI-RS configurations 0 to 4 through 8 CSI-RS ports among the CSI-RS configurations of Table 8. The CSI-RS ports refer to antenna ports configured for CSI-RS transmission. For example, referring to Equation 14, antenna ports 15 to 22 correspond to the CSI-RS ports. Since CSI-RS configuration differs according to the number of CSI-RS ports, if the numbers of antenna ports configured for CSI-RS transmission differ, even the same CSI-RS configuration number corresponds to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 8 or Table 9 but also with subframes in which CSI-RSs are configured. That is, if subframes for CSI-RS transmission differ even when CSI-RS configuration numbers are the same in Table 8 or Table 9, CSI-RS configurations also differ. For example, if CSI-RS transmission periods differ or if start subframes in which CSI-RS transmission is configured in one radio frame differ, this may be considered as different CSI-RS configurations.

The UE may measure a channel using a CSI-RS and demodulate or decode a PDSCH using a UE-RS. In the 3GPP LTE-A system, transmission mode 9 in which the UE is capable of receiving a maximum of 8 layers by using the UE-RS is defined. Since the UE-RS is transmitted on a layer basis, the UE may demodulate layer(s) for the UE by using UE-RS(s) as described above. If the UE configured as transmission mode 9 is configured to report a PMI/RI, the UE may derive channel measurements for calculating a CQI value to be reported in UL subframe n based on the CSI-RS. The UE, which is configured as transmission mode 9 or other UE-RS based transmission modes but configured to disable PMI/RI reporting or which is configured as one of transmission modes 1 to 8, may perform channel measurements for calculating a CQI based on a CRS.

When multi-node transmission is configured for the UE, the UE may receive CSI-RS configuration information about one or more CSI-RS configuration(s). For example, joint transmission in which a plurality of CSI-RS configurations is used together to transmit a specific PDSCH may be performed. In this case, the UE may consider the plurality of CSI-RS configurations as one aggregated CSI-RS configuration and calculate the RI/CQI under the assumption that the PDSCH is transmitted while a precoder is cyclically applied as a predesignated pattern in the aggregated CSI-RS configuration. That is, upon receiving information about the plurality of CSI-RS configurations, the UE may aggregate the CSI-RS configurations and consider the CSI-RS configurations as one aggregated CSI-RS configuration. The UE may calculate the RI/CQI under the assumption that the precoder is cyclically applied to CSI-RSs corresponding to the aggregated CSI-RS configuration as a predesignated pattern. As an example, when the UE receives CSI-RS configuration 1 for 4 antenna ports and CSI-RS configuration 2 for two antenna ports as CSI-RS configuration information, i.e., if CSI-RS configuration 1 and CSI-RS configuration 2 are configured for the UE and each configuration includes four antenna ports, the UE may regard the two CSI-RS configurations as one CSI-RS configuration for 8 antenna ports and calculate the RI/CQI under the assumption that a precoder defined for 8 transmit antennas is applied while changing to a predetermined pattern per PRB. To this end, the eNB may inform the UE of which CSI-RS configurations should be aggregated to assume open-loop MIMO during open-loop RI/CQI calculation through a higher-layer signal such as an RRC signal or through an indicator included in DCI.

Meanwhile, in a process of calculating the RI/CQI by aggregating the plurality of CSI-RS configurations, the case in which the number of antenna ports of an aggregated CSI-RS configuration is not equal to the number of transmit antenna ports defined in a predesignated precoder codebook, i.e. in a PMI codebook, may occur because the numbers of transmit antenna ports of CSI-RS configurations are not equal. For example, when CSI-RS configuration 1 for 4 antenna ports and CSI-RS configuration 2 for two antenna ports are aggregated, the aggregated CSI-RS configuration includes 6 antenna ports. Generally, since a precoder codebook is designed by assuming $2^n$ transmit antenna ports, a precoder codebook for 6 antenna ports may be absent. In this case, only some antenna ports may be extracted from a specific CSI-RS configuration to form the aggregated CSI-RS configuration. For example, if CSI-RS configuration 1 for 4 antenna ports and CSI-RS configuration 2 for two antenna ports are aggregated, only two antenna ports may be extracted from CSI-RS configuration 1 and then aggregated with CSI-RS configuration 2 to form an aggregated CSI-RS configuration for four antenna ports. The RI/CQI may be calculated using CSI-RS(s) according to the aggregated CSI-RS configuration for the 4 antenna ports. Namely, if the sum of antenna ports of CSI-RS configurations is different from the number of antenna ports defined in the codebook, CSI-RS configurations may be aggregated in a manner of using the greatest number of antenna ports not exceeding the sum of the antenna ports of the CSI-RS configurations among the number of antenna ports defined in the codebook. For example, assuming that codebooks are defined for $2^n$ (n=0, 1, 2, 3, 4) transmit antenna ports and that the number of antenna ports for CSI-RS configuration(s) received by the UE is y, only $\text{floor}\{\log_2(y)\}$ antenna ports may be extracted from the CSI-RS configuration(s) to form an aggregated CSI-RS configuration.

If there are many antenna ports of an individual CSI-RS configuration (e.g. if each CSI-RS configuration includes 8 antenna ports), since simple aggregation of CSI-RS configurations corresponds to too many antenna ports, operation for extracting some antenna ports from antenna ports of CSI-RS configurations is advantageous in that the number of antenna ports of the aggregated CSI-RS configuration can be reduced. Extracting only some antenna ports from antenna ports of CSI-RS configurations may mean that only CSI-RSs for some antenna port(s) among antenna ports of a specific CSI-RS configuration are selected. Alternatively, if any CSI-RS configuration includes N1 transmit antennas and if only N2 antennas of the N1 transmit antennas (where N2<N1) should be used to form an aggregated CSI-RS configuration, extracting only some antenna ports may mean that an N2×N1 precoding matrix is applied to CSI-RSs for the N1 transmit antennas. The N2×N1 precoding matrix may be predesignated or may vary with a predetermined scheme per PRB. Consequently, extracting only some antenna ports from antenna ports of a CSI-RS configuration may mean that the UE calculates the RI/CQI under the assumption that (N2-N1) antenna ports among N2 antenna ports corresponding to the CSI-RS configuration, i.e., among N2 antenna ports configured for CSI-RS transmission, do not participate in CSI-RS transmission. In other words, the UE may derive and feed back the RI/CQI under the assumption that CSI-RSs are transmitted only on N2 antenna ports among N1 antenna ports configured for CSI-RS transmission.

According to the embodiments of the present invention, open-loop MIMO may be performed based on a UE-RS. If open-loop MIMO is performed based on a CRS, since the CRS is transmitted over all bands, i.e., over all PRBs, irrespective of whether a PDSCH is present and is transmitted not UE-specifically but cell-specifically, the UE may assume that one precoder is applied to all bands or no precoder is applied upon calculating the RI or CQI. In contrast, according to the embodiments of the present invention, since the same precoder may be applied to a predetermined number of contiguous PRBs under a prescribed condition or PRB bundling may be disabled in open-loop MIMO, more accurate CQI or RI reporting is possible.

Referring to FIG. 10, the UE RF unit receives DL data on a PDSCH and transmits the DL data to the UE processor. The UE processor may detect a PDCCH and control the UE RF unit to receive the PDSCH on PRB(s) according to DCI of the PDCCH. The UE processor may obtain the DL data by decoding a signal received on the PDSCH. In decoding the signal received on the PDSCH, the UE processor may use UE-RS(s) received on PRB(s) to which the PDSCH is mapped. That is, the UE processor may estimate a DL channel using the UE-RS(s) and decode the signal on the PDSCH under the assumption that the DL data has been transmitted on the same channel as the estimated channel. If feedback of a PMI is configured for the UE, the UE processor may decode the received signal under the assumption that the same precoder is applied to a plurality of contiguous PRBs to which the PDSCH is mapped, i.e., to which the PDSCH is scheduled. In other words, the UE processor of the present invention may decode the received signal under the assumption that PRB bundling is enabled and that the DL data and relevant UE-RS(s) are transmitted to the UE after being precoded by the same precoder on the plurality of contiguous PRBs. In contrast, if feedback of an RI or a CQI is configured for the UE without feedback of the PMI or if a VRB is assigned for the PDSCH, the UE processor may decode the received signal by individually estimating a channel with respect to each PRB to which the PDSCH is scheduled under the assumption that PRB bundling is disabled. In other words, the UE processor may decode the received signal on the PDSCH under the assumption that a different precoder may be applied to each PRB to which the PDSCH is scheduled.

If the PDSCH carries system information or paging information even when feedback of the PMI is configured for the UE, the UE processor may decode the signal received on the PDSCH under the assumption that PRB bundling is disabled.

If PRB bundling is enabled, the UE processor may decode the signal received on the PDSCH under the assumption that the same precoder is applied to all PRBs allocated to the PDSCH among PRBs in a PRG.

The UE RF unit may receive CSI-RSs and transmit the CSI-RSs to the UE processor. The UE processor may control the RF unit to receive CSI-RS configuration information about one or more CSI-RS configuration(s) and to receive CSI-RSs on REs occupied by the CSI-RSs in subframes in which CSI-RS transmission is configured based on the CSI-RS configuration information. The UE processor may derive an RI or a CQI based on a signal received on the REs occupied by the CSI-RSs in subframes in which CSI-RS transmission is configured based on the CSI-RS configuration information. The UE processor may calculate the RI or the CQI under the assumption that a PM selected from a codebook defined with respect to the number of antenna ports corresponding to the one or more CSI-RS configuration(s) according to a predetermined rule is applied to PRB(s) of a band on which feedback of the RI or the CQI is needed.

Upon receiving the CSI-RS configuration information about a plurality of CSI-RS configurations, the UE processor may aggregate the plurality of CSI-RS configurations to form one aggregated CSI-RS configuration and derive the RI or the CQI using CSI-RSs according to the aggregated CSI-RS configuration. When the number of antenna ports for the plurality of CSI-RS configurations, N1, is not equal to the number of antenna ports defined in a codebook, N2 (where N2<N1), the UE processor may be configured to derive the RI or the CQI under the assumption that a CSI-RS is transmitted only on N2 antenna ports among the N1 antenna ports.

If the UE assumes that PRB bundling is enable or disabled according to any one of the embodiments of the present invention, the eNB preferably transmits a signal suitable for a case assumed by the UE because signal decoding performance by the UE may be deteriorated when a signal is transmitted by a scheme different from a scheme assumed by the UE. Accordingly, the eNB processor of the present invention applies the same precoder or different precoders to contiguous PRBs to which the PDSCH is mapped according to how PRB bundling is assumed by the UE, upon transmitting DL data on the PDSCH and UE-RS(s) corresponding to the DL data on a PRB to which the PDSCH is mapped. For example, if feedback of the PMI is configured for the UE, the eNB processor may apply the same precoder to a plurality of contiguous PRBs to which the PDSCH is mapped, i.e., to which the PDSCH is scheduled. In other words, when the UE assumes that PRB bundling is enabled, the eNB processor of the present invention controls the eNB RF unit to transmit DL data to be transmitted in the plurality of contiguous PRBs and UE-RS(s) corresponding to the DL data to the UE after precoding the DL data and the UE-RS(s) by the same precoder. If feedback of the RI or the CQI is configured for the UE without feedback of the PMI or if a VRB is assigned for the PDSCH, the eNB processor is configured to individually apply a precoder to each PRB to which the PDSCH is scheduled because the UE will assume that PRB bundling is disabled. The eNB processor controls the eNB RF unit to transmit the DL data and the UE-RS(s) on the PRB(s).

If the PDSCH carries system information or paging information even when feedback of the PMI is configured for the UE, the UE may assume that PRB bundling is disabled and then the eNB processor may disable PRB bundling and set a precoder per PRB so that the DL data and the UE-RS(s) in each PRB can be precoded.

If PRB bundling is enabled, the eNB processor may apply the same precoder to all PRBs allocated to the PDSCH among PRBs in a PRG.

The embodiments of the present invention may be used by combination thereof. For example, PMI bundling may be enabled or disabled according to at least one of whether PMI feedback is configured for the UE, whether DVRB resource allocation is assigned to the PDSCH or LVRB resource allocation is assigned to the PDSCH, and whether the PDSCH carries data for a specific UE (i.e. unicast data) or information for a plurality of UEs (e.g. multicast or broadcast information such as system information, paging information, etc.).

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a base station, a UE, or other devices in a wireless communication system.

The invention claimed is:

1. A method for receiving downlink (DL) data by a user equipment (UE), the method comprising:
receiving the DL data through a physical downlink shared channel (PDSCH); and
decoding the DL data using a UE specific reference signal (UE-RS) received on physical resource blocks (PRBs) allocated to the PDSCH,
wherein the DL data is decoded under either a first assumption that PRB bundling is enabled, or under a second assumption that the PRB bundling is disabled,
wherein the DL data is decoded under the first assumption if a precoding matrix index (PMI) is configured to be fed back together with rank information (RI) or a channel quality index (CQI), and if a resource allocation type for the PDSCH is not a distributed type but is a localized type, and
wherein, under the first assumption, a same precoder is applied to all of the PRBs allocated to the PDSCH among a predetermined number of contiguous PRBs belonging to a PRB group (PRG).

2. The method according to claim 1, further comprising:
receiving information about one channel state information reference signal (CSI-RS) configuration or a plurality of CSI-RS configurations; and
feeding back the RI or the CQI based on the one CSI-RS configuration or the plurality of CSI-RS configurations.

3. The method according to claim 2, wherein the RI or the CQI is fed back based on one aggregated CSI-RS configuration formed by aggregating the plurality of CSI-RS configurations.

4. The method according to claim 2, wherein, if a number N1 of antenna ports for the plurality of CSI-RS configurations is not equal to a number N2 of antenna ports defined in a codebook, the RI or the CQI is fed back under the assumption that a CSI-RS is transmitted only over the N2 antenna ports among the N1 antenna ports, and wherein N2<N1.

5. A user equipment (UE) for receiving downlink (DL) data, the user equipment comprising:
a radio frequency (RF) unit; and
a processor configured to:
control the RF unit to receive the DL data through a physical downlink shared channel (PDSCH), and
decode the DL data using a UE specific reference signal (UE-RS) received on physical resource blocks (PRBs) allocated to the PDSCH,
wherein the DL data is decoded under either a first assumption that PRB bundling is enabled, or under a second assumption that the PRB bundling is disabled,
wherein the DL data is decoded under the first assumption if a precoding matrix index (PMI) is configured to be fed back together with rank information (RI) or a channel quality index (CQI), and if a resource allocation type for the PDSCH is not a distributed type but is a localized type, and
wherein, under the first assumption, the processor is further configured to apply a same precoder to all of the PRBs allocated to the PDSCH among a predetermined number of contiguous PRBs belonging to a PRB group (PRG).

6. The UE according to claim 5,
wherein the processor is further configured to:
control the RF unit to receive information about one channel state information reference signal (CSI-RS) configuration or a plurality of CSI-RS configurations, and
control the RF unit to feed back the RI or the CQI based on the one CSI-RS configuration or the plurality of CSI-RS configurations.

7. The UE according to claim 6,
wherein the processor is further configured to derive the RI or the CQI based on one aggregated CSI-RS configuration formed by aggregating the plurality of CSI-RS configurations.

8. The UE according to claim 6,
wherein, if a number N1 of antenna ports for the plurality of CSI-RS configurations is not equal to a number N2 of antenna ports defined in a codebook, the processor is configured to derive the RI or the CQI under the assumption that a CSI-RS is transmitted only over the N2 antenna ports among the N1 antenna ports, and wherein N2<N1.

9. A method for transmitting downlink (DL) data by a base station (BS), the method comprising:
transmitting the DL data to a user equipment (UE) through a physical downlink shared channel (PDSCH); and
transmitting a UE specific reference signal (UE-RS) on physical resource blocks (PRBs) allocated to the PDSCH,
wherein, if a precoding matrix index (PMI) is configured to be fed back together with rank information (RI) or a channel quality index (CQI), and if a resource allocation type for the PDSCH is not a distributed type but is a localized type, the DL data and the UE-RS are transmitted by applying all of the PRBs allocated to the PDSCH among a predetermined number of contiguous PRBs belonging to a PRB group (PRG), and otherwise, the DL data and the UE-RS are transmitted by applying different precoders to the PRBs allocated to the PDSCH.

10. A base station (BS) for transmitting downlink (DL) data, the BS comprising:
a radio frequency (RF) unit; and
a processor configured to:
control the RF unit to transmit the DL data to a user equipment (UE) through a physical downlink shared channel (PDSCH), and
control the RF unit to transmit a UE specific reference signal (UE-RS) on physical resource blocks (PRBs) allocated to the PDSCH,
wherein, if a precoding matrix index (PMI) is configured to be fed back together with rank information (RI) or a channel quality index (CQI), and if a resource allocation type for the PDSCH is not a distributed type but is a localized type, the processor is further configured to apply a same precoder to all of the PRBs allocated to the PDSCH among a predetermined number of contiguous PRBs belonging to a PRB group (PRG), and otherwise, the processor is further configured to apply different precoders to the PRBs allocated to the PDSCH.

11. The method according to claim 9, further comprising:
transmitting information about one channel state information reference signal (CSI-RS) configuration or a plurality of CSI-RS configurations; and transmitting a CSI-RS based on the one CSI-RS configuration or the plurality of CSI-RS configurations.

12. The method according to claim 11, further comprising:
receiving the RI or the CQI fed back based on one aggregated CSI-RS configuration formed by aggregating the plurality of CSI-RS configurations.

13. The method according to claim 11,
wherein, if a number N1 of antenna ports for the plurality of CSI-RS configurations is not equal to a number N2 of antenna ports defined in a codebook, the CSI-RS is transmitted only over the N2 antenna ports among the N1 antenna ports, and wherein N2<N1.

14. The BS according to claim 10,
wherein the processor is further configured to:
control the RF unit to transmit information about one channel state information reference signal (CSI-RS) configuration or a plurality of CSI-RS configurations, and
control the RF unit to transmit a CSI-RS based on the one CSI-RS configuration or the plurality of CSI-RS configurations.

15. The BS according to claim 14,
wherein the processor is further configured to control the RF unit to receive the RI or the CQI fed back based on one aggregated CSI-RS configuration formed by aggregating the plurality of CSI-RS configurations.

16. The BS according to claim 14,
wherein, if a number N1 of antenna ports for the plurality of CSI-RS configurations is not equal to a number N2 of antenna ports defined in a codebook, the CSI-RS is transmitted only over the N2 antenna ports among the N1 antenna ports, wherein N2<N1.

\* \* \* \* \*